US011184126B2

(12) United States Patent
Akkarakaran et al.

(10) Patent No.: US 11,184,126 B2
(45) Date of Patent: Nov. 23, 2021

(54) TECHNIQUES FOR BEAM ASSIGNMENTS FOR BEAMFORMING WIRELESS COMMUNICATIONS

(71) Applicant: QUALCOMM Incorporated, San Diego, CA (US)

(72) Inventors: Sony Akkarakaran, Poway, CA (US); Xiao Feng Wang, San Diego, CA (US); Tao Luo, San Diego, CA (US); Makesh Pravin John Wilson, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/376,989

(22) Filed: Apr. 5, 2019

(65) Prior Publication Data
US 2019/0312698 A1      Oct. 10, 2019

Related U.S. Application Data

(60) Provisional application No. 62/654,250, filed on Apr. 6, 2018.

(51) Int. Cl.
*H04L 5/00* (2006.01)
*H04W 72/04* (2009.01)

(52) U.S. Cl.
CPC ......... *H04L 5/0048* (2013.01); *H04W 72/046* (2013.01)

(58) Field of Classification Search
CPC ..... H04L 5/0048; H04L 52/04; H04L 52/345; H04W 72/046
See application file for complete search history.

(56) References Cited

U.S. PATENT DOCUMENTS

| 2014/0071933 | A1* | 3/2014 | Lee | H04W 52/367 |
| | | | | 370/329 |
| 2014/0112260 | A1* | 4/2014 | Sorrentino | H04W 52/325 |
| | | | | 370/329 |

(Continued)

OTHER PUBLICATIONS

Ericsson: "On UL Beam Indication", 3GPP Draft; R1-1718747_On UL Beam Indication, 3rd Generation Partnership Project (3GPP), Mobile Competence Centre, 650, Route Des Lucioles, F-06921 Sophia-Anti Polis Cedex, France, vol. RAN WG1, No. Prague, CZ; Oct. 9, 2017-Oct. 13, 2017, Oct. 8, 2017 (Oct. 8, 2017), 4 Pages, XP051341917, Retrieved from the Internet: URL: http://www.3gpp.org/ftp/Meetings_3GPP_SYNC/RAN1/Docs/ [retrieved on Oct. 8, 2017], Section 2.

(Continued)

*Primary Examiner* — Brian P Cox
(74) *Attorney, Agent, or Firm* — Qualcomm Incorporated

(57) ABSTRACT

Aspects described herein relate to configuring a media access control (MAC)-control element (CE) to update a sounding reference signal (SRS) beam within a wireless communication system. Other aspects described herein relate to configuring default beam information for determining a beam for data channel communications within the wireless communication system. A user equipment (UE) or other device can determine to use the default beam information for configuring the beam for a data channel communication and for performing power control using, e.g., physical uplink shared channel (PUSCH) parameters. In addition, in some examples, the device can transmit the data channel communication using a beam configured based on the default beam information.

30 Claims, 26 Drawing Sheets

(56) References Cited

U.S. PATENT DOCUMENTS

2018/0332541 A1* 11/2018 Liu .................... H04W 72/042
2019/0174466 A1*  6/2019 Zhang ................. H04L 5/005
2019/0261281 A1*  8/2019 Jung .................. H04W 52/146
2020/0037360 A1*  1/2020 Qian .................. H04W 52/225

OTHER PUBLICATIONS

International Search Report and Written Opinion—PCT/US2019/026219—ISA/EPO—dated Aug. 26, 2019.
Partial International Search Report—PCT/US2019/026219—ISA/EPO—dated Jul. 1, 2019.
Samsung: "Discussion on Beam Indication for UL Transmission," 3GPP Draft; R1-1717620, 3rd Generation Partnership Project (3GPP), Mobile Competence Centre; 650, Route Des Lucioles; F-06921 Sophia-Antipolis Cedex; France, vol. RAN WG1, No. Prague, Czech; Oct. 9, 2017-Oct. 13, 2017, Oct. 8, 2017, XP051340806, 6 pages, Retrieved from the Internet: URL: http://www.3gpp.org/ftp/Meetings_3GPP_SYNC/RAN1/Docs/ [retrieved on Oct. 8, 2017], Section 2, 3.1, 3.2 and 3.3.

* cited by examiner $$P_{\text{PUCCH},f,c}(i,q_u,q_d,l) = P_{O\_\text{PUCCH},f,c}(q_u) + PL_{f,c}(q_d) + \Delta_{F\_\text{PUCCH}}(F) + \Delta_{TF,f,c}(i) + g_{f,c}(i,l)$$

902

$$P_{\text{PUSCH},f,c}(i,j,q_d,l) = P_{O\_\text{PUSCH},f,c}(j) + \alpha_{f,c}(j) \cdot PL_{f,c}(q_d) + \Delta_{TF,f,c}(i) + f_{f,c}(i,l) + 10\log_{10}(2^\mu \cdot M_{\text{RB},f,c}^{\text{PUSCH}}(i))$$

904

906

PUSCH-PowerControl ::=
 tpc-Accumulation Enum {disabled}
 msg3-Alpha (optional: Default=1)
 P0 for grantFree/SPS dBm, -202 to 24 in 2dB steps
 List of 1-Max#(=30) P0-PUSCH-AlphaSets IEs,
  each has ID; P0 -16-15 (1dB steps); Alpha (optional: default=1)
 AddmodList & ReleaseList for PUSCH-pathlossReferenceRS IEs
  each has ID ((0-Max#(=4)-1) & choice {SSB, NZP-CSIRS-
 Resource}-index
 twoPUSCH-PC-AdjustmentStates Enum {twostates} optional
 deltaMCS (used to compute DeltaTF,f,c(i)
 AddmodList & ReleaseList for SRI-PUSCH-PowerControl IEs
  each has ID (0-Max#(=16)-1),
  PUSCH-pathlossReferenceRS-ID,
  P0-PUSCH-AlphaSetId, and closedLoopIndex (i0 or i1)

FIG. 9

TECHNIQUES FOR BEAM ASSIGNMENTS FOR BEAMFORMING WIRELESS COMMUNICATIONS

CLAIM OF PRIORITY UNDER 35 U.S.C. § 119

The present application for patent claims priority to Provisional Application No. 62/654,250 entitled "TECHNIQUES FOR BEAM ASSIGNMENTS FOR BEAMFORMING WIRELESS COMMUNICATIONS," filed Apr. 6, 2018, which is assigned to the assignee hereof and hereby expressly incorporated by reference herein.

BACKGROUND

Field

Aspects of the present disclosure relate generally to wireless communication systems, and more particularly, to methods and apparatus for determining beams for beamforming signals in wireless communications.

Background

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (also known as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In wireless communications technologies, such as 5G, LTE, etc., physical uplink shared channel (PUSCH) beams for beamforming PUSCH transmissions can be determined based on sounding reference signal (SRS) resource indicator (SRI) previously transmitted from a device. However, issues can arise if the overall system is configured to require the use of radio resource control (RRC) to update an SRS beam. Moreover, sometimes the SRI is not present (e.g., in the case of fallback downlink control information (DCI) having no SRI, before receiving an SRS configuration, etc.), in which case determining the PUSCH beam (e.g., based on SRI) may be undefined.

SUMMARY

In one aspect, a method of wireless communication includes: configuring a non-radio resource control (RRC) control element to update a sounding beam for a data channel communication; updating the sounding beam using the non-RRC control element; and transmitting the data channel communication based, at least in part, on the sounding beam updated using the non-RRC control element.

In another aspect, a user equipment (UE) includes: at least one antenna; and a processing circuit, operatively coupled to the at least one antenna, the processing circuit configured to (a) configure a non-RRC control element to update a sounding beam for a data channel communication, (b) update the sounding beam using the non-RRC control element, and (c) transmit the data channel communication based, at least in part, on the sounding beam updated using the non-RRC control element.

In yet another aspect, a method for wireless communication within a wireless communication system includes: determining whether or not a sounding beam for a data channel communication is available; deriving, in response to a determination that a sounding beam is not available, at least one power control parameter for the data channel communication from a radio resource control (RRC) control configuration; and transmitting the data channel communication based, at least in part, on the at least one power control parameter derived from the RRC control configuration.

In still yet another aspect, a user equipment (UE) includes: at least one antenna; and a processing circuit, operatively coupled to the at least one antenna, the processing circuit configured to (a) determine whether or not a sounding beam for a data channel communication is available, (b) derive, in response to a determination that a sounding beam is not available, at least one power control parameter for the data channel communication from a radio resource control (RRC) control configuration, and (c) transmit the data channel communication based, at least in part, on the at least one power control parameter derived from the RRC control configuration.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 9 shows power control processing and a power control module for beam configuration under an illustrative embodiment;

DETAILED DESCRIPTION

Figure 1:
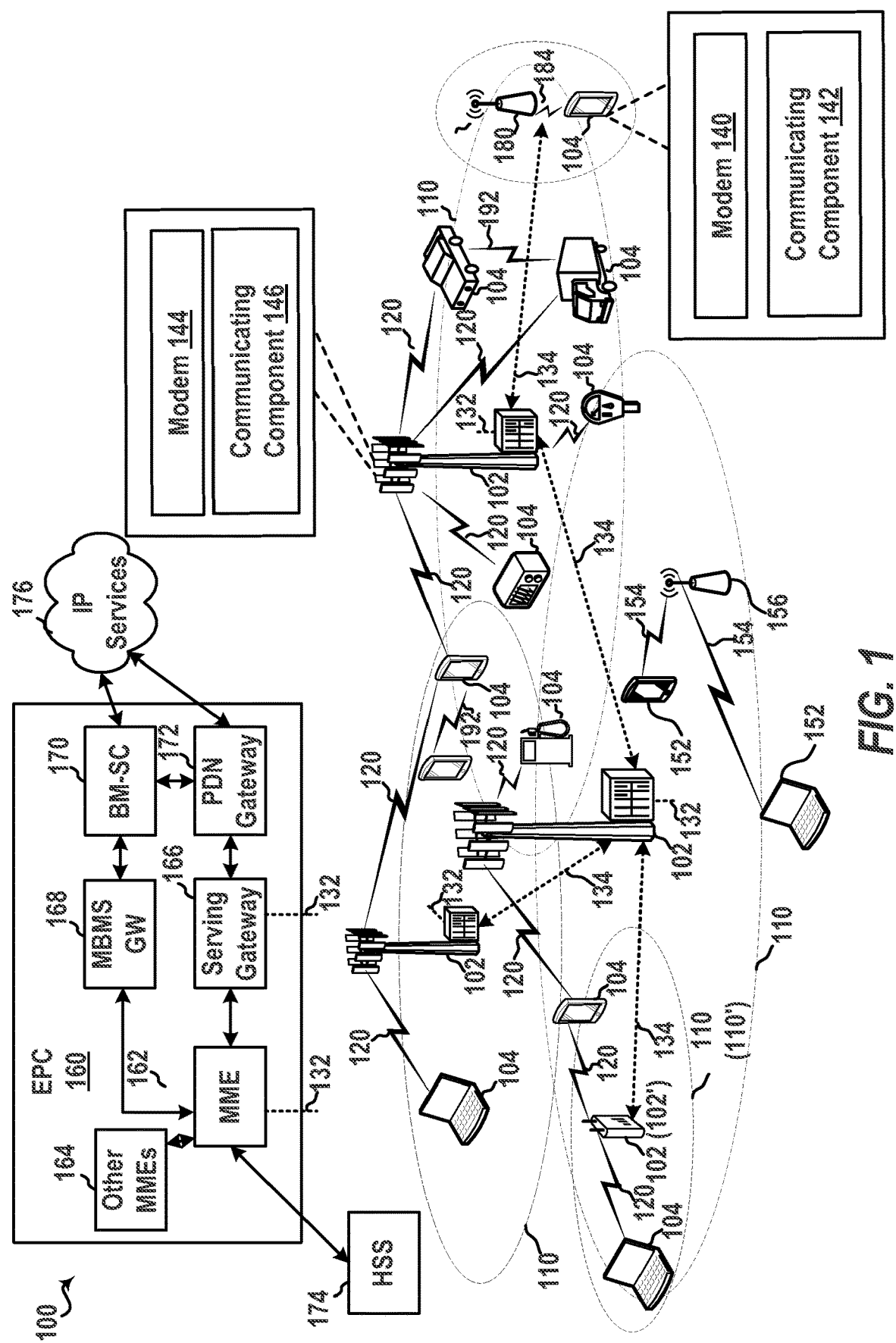
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Some features described herein generally relate to using a non-radio resource control (RRC) control element (such as a media access control (MAC) control element (CE)) to update a sounding beam (such as a sounding reference signal (SRS) beam) without the need to use or introduce any new RRC configuration parameters, particularly within so-called "fifth generation" (5G) wireless communications technology systems or other wireless communications systems. The use of MAC-CE to update SRS beams without relying on RRC may facilitate faster updates of physical uplink shared channel (PUSCH) beams, particularly in scenarios where only one SRS is configured.

Other described features generally relate to configuring default beam information to be used by a device for determining a beam for data channel communications, where other beam information may not be available. For example, the device may typically use an SRS resource indicator (SRI) to determine a beam for data channel communications, but the SRS and/or the SRI may not always be present or defined. In an example, the device may use the default beam configuration for determining the beam to use in transmitting the data channel communications. In an example, the device may configure the default beam information semistatically as a virtual control channel resource from which the beam may be derived (e.g., without actually transmitting control data over the virtual control channel resources). In another example, the device may configure the default beam information as another beam, such as an actual control channel resource, another signal, etc., which may be based on a configuration received from a network.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of approaches can also be used.

Example of Wireless Communication Access Network

Referring to FIG. 1, in accordance with various aspects described herein, an example wireless communication access network 100 includes at least one UE 104 with a modem 140 for communicating in a wireless network and a communicating component 142 for determining and/or assigning beam information, as described further herein. Further, wireless communication access network 100, also referred to as a wireless wide area network (WWAN), includes at least one base station 102 via which the UE 104 can communicate with one or more nodes of the wireless communication access network to communicate data corresponding to the service. The base station 102 can also have a modem 144 for communicating in the wireless network and a communicating component 146 for receiving beam failure recovery request (BFRQ) signals, as described further herein. In this regard, for example, communicating component 142 can determine default beam information for generating beams for data channel communications to the base station 102. In another example, communicating component 142 can use parameters or properties of a component carrier (CC) or related communication to indicate information regarding a BFRQ, which communicating component 146 can receive and determine parameters for transmitting a recovery beam to the UE 104. In other examples, the discussed further below, the UE can configure MAC-CE to update SRS beams.

The one or more UEs 104 and/or the one or more base stations 102 may communicate with other UEs and/or other base stations via an Evolved Packet Core (EPC) 160. The base stations 102 (which can be collectively referred to as Evolved Universal Mobile Telecommunications System (UMTS) Terrestrial Radio Access Network (E-UTRAN)) may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 156 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station gNB 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Illustrative Examples of UE Implementations

Aspects are depicted with reference to one or more components and one or more methods that may perform the actions or operations described herein. Although the operations described herein are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a tangibly-embodied software component capable of performing the described actions or functions.

Figure 2:
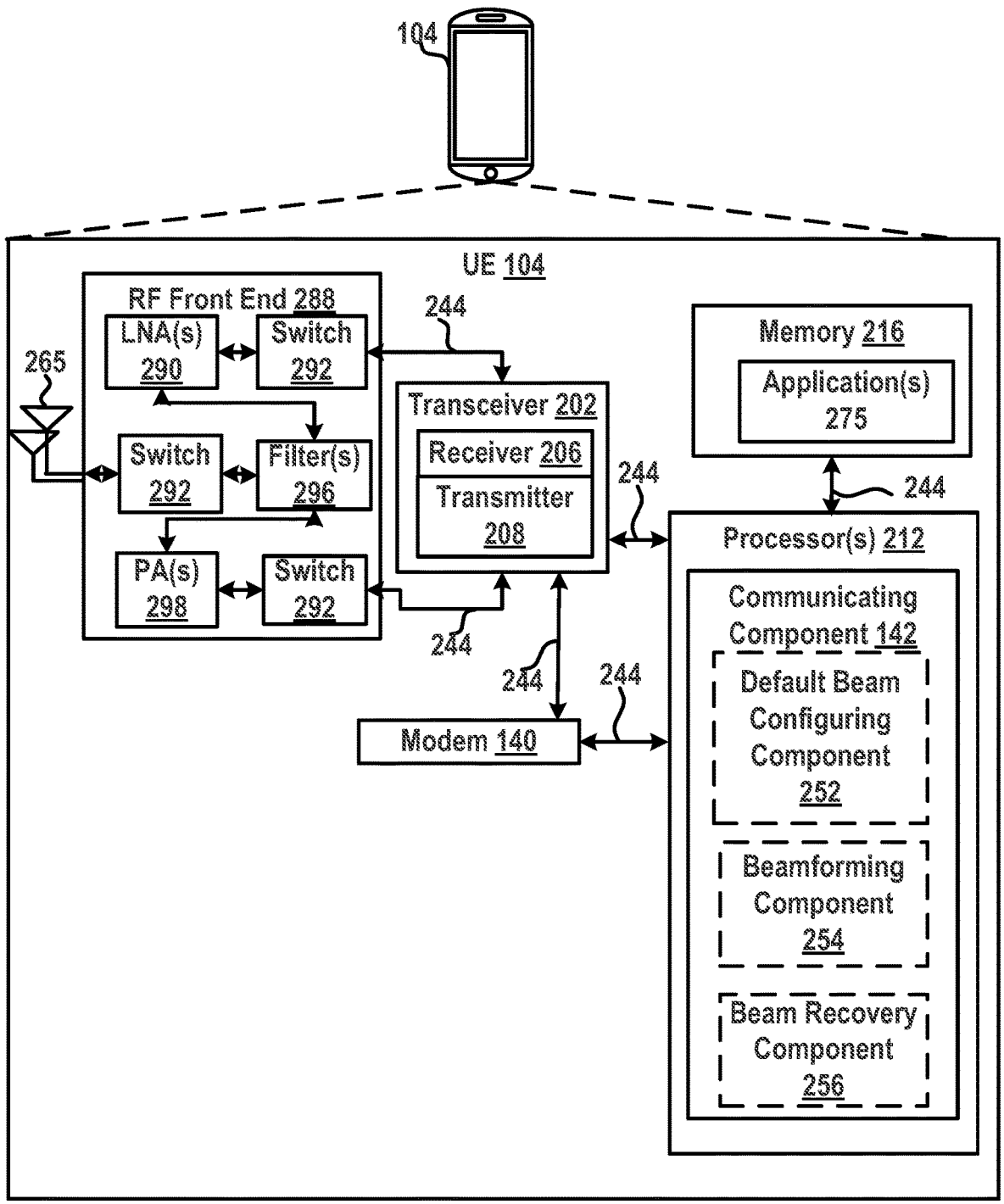
FIG. 2 is a block diagram illustrating an example of a user equipment (UE), in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or communicating component 142 to enable one or more of the functions described herein related to determining and assigning beam information for transmitting data channel communications as described further herein. Further, the one or more processors 212, modem 140, memory 216, transceiver 202, RF front end 288 and one or more antennas 286, may be configured to support voice and/or data calls (simultaneously or non-simultaneously) in one or more radio access technologies.

In an aspect, the one or more processors 212 can include a modem 140 and/or can be part of the modem 140 that uses one or more modem processors. Thus, the various functions related to communicating component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with communicating component 142 may be performed by transceiver 202.

Also, memory 216 may be configured to store data used herein and/or local versions of applications 275 or communicating component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 142 and/or one or more of its subcomponents, and/or data associated therewith, when UE 104 is operating at least one processor 212 to execute communicating component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292 (two of which are shown), one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Default Beam Configuration Components and Methods

In an aspect, communicating component 142 can include a default beam configuring component 252 for configuring default beam information that can be used to generate a beam for data channel communications in absence of other explicit beam information (e.g., in absence of an SRI, a prior recent actual physical uplink control channel (PUCCH), etc.), and/or a beamforming component 254 for beamforming data channel communication signals based at least in part on the default beam information (or other determined beam information). Communicating component 142 can also optionally include a beam recovery component 256 for transmitting a BFRQ signal over resources of a CC to indicate beam failure and/or recovery information to a base station 102 to be used in transmitting a recovery beam.

In an aspect, the processor(s) 212 may correspond to one or more of the processors described in connection with the UE in FIG. 10. Similarly, the memory 216 may correspond to the memory described in connection with the UE in FIG. 10.

Figure 3:
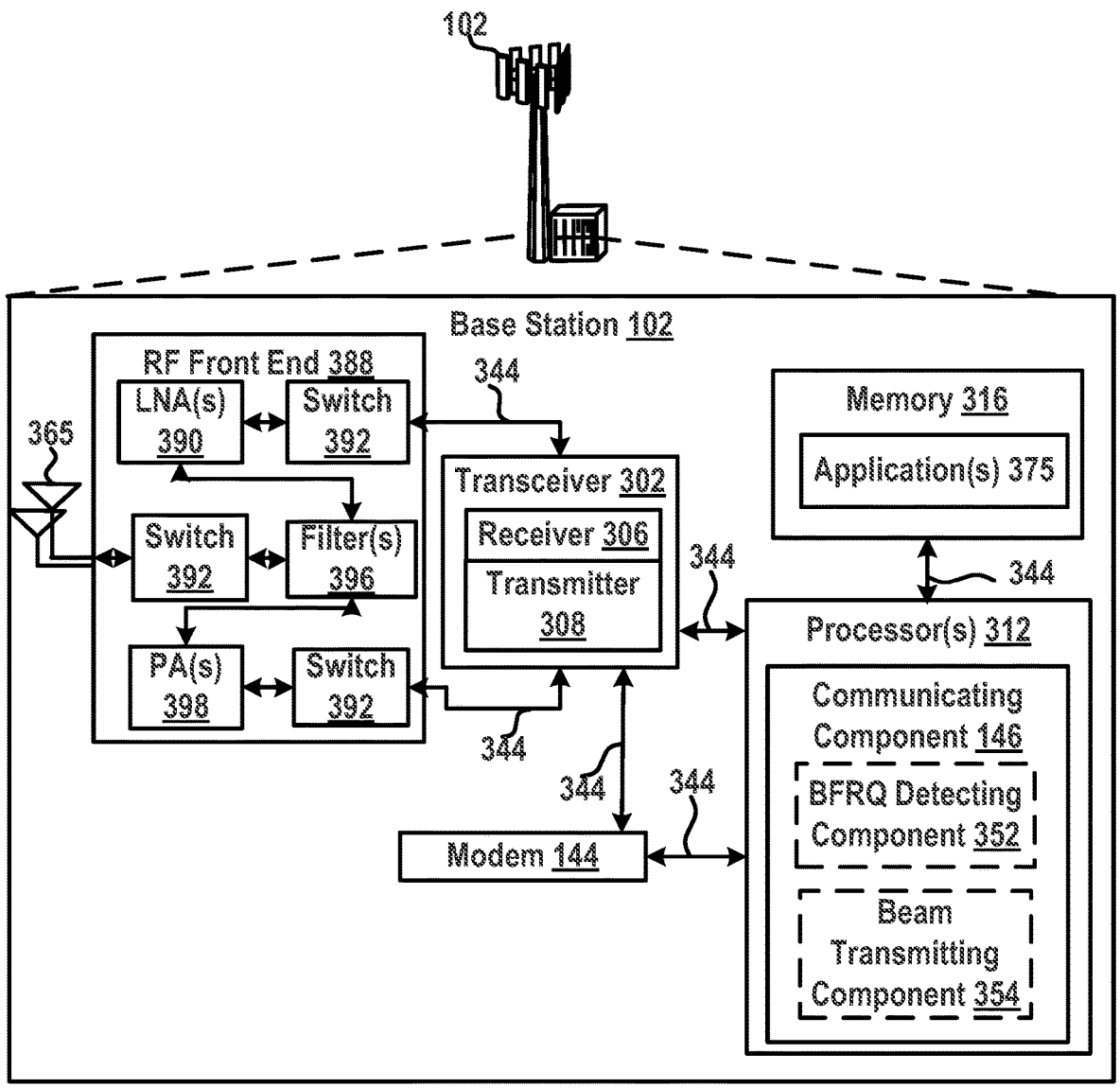
FIG. 3 is a block diagram illustrating an example of a base station, in accordance with various aspects of the present disclosure.

Referring to FIG. 3, one example of an implementation of base station 102 may include a variety of components, some of which have already been described above, but including components such as one or more processors 312 and memory 316 and transceiver 302 in communication via one or more buses 344, which may operate in conjunction with modem 144 and communicating component 146 to enable one or more of the functions described herein related to receiving BFRQ signals and transmitting corresponding recovery beams.

The transceiver 302, receiver 306, transmitter 308, one or more processors 312, memory 316, applications 375, buses 344, RF front end 388, LNAs 390, one or more switches 392 (two of which are shown), filters 396, PAs 398, and one or more antennas 365 may be the same as or similar to the corresponding components of UE 104, as described above, but configured or otherwise programmed for base station operations as opposed to UE operations.

In an aspect, communicating component 146 can optionally include a BFRQ detecting component 352 for detecting BFRQ signals and/or related parameters based on receiving a BFRQ signal from a UE 104, and/or a beam transmitting component 354 for transmitting a recovery beam to the UE 104 based on the one or more parameters related to the BFRQ signals.

In an aspect, the processor(s) 312 may correspond to one or more of the processors described in connection with the base station in FIG. 10. Similarly, the memory 316 may correspond to the memory described in connection with the base station in FIG. 10.

Figure 4:
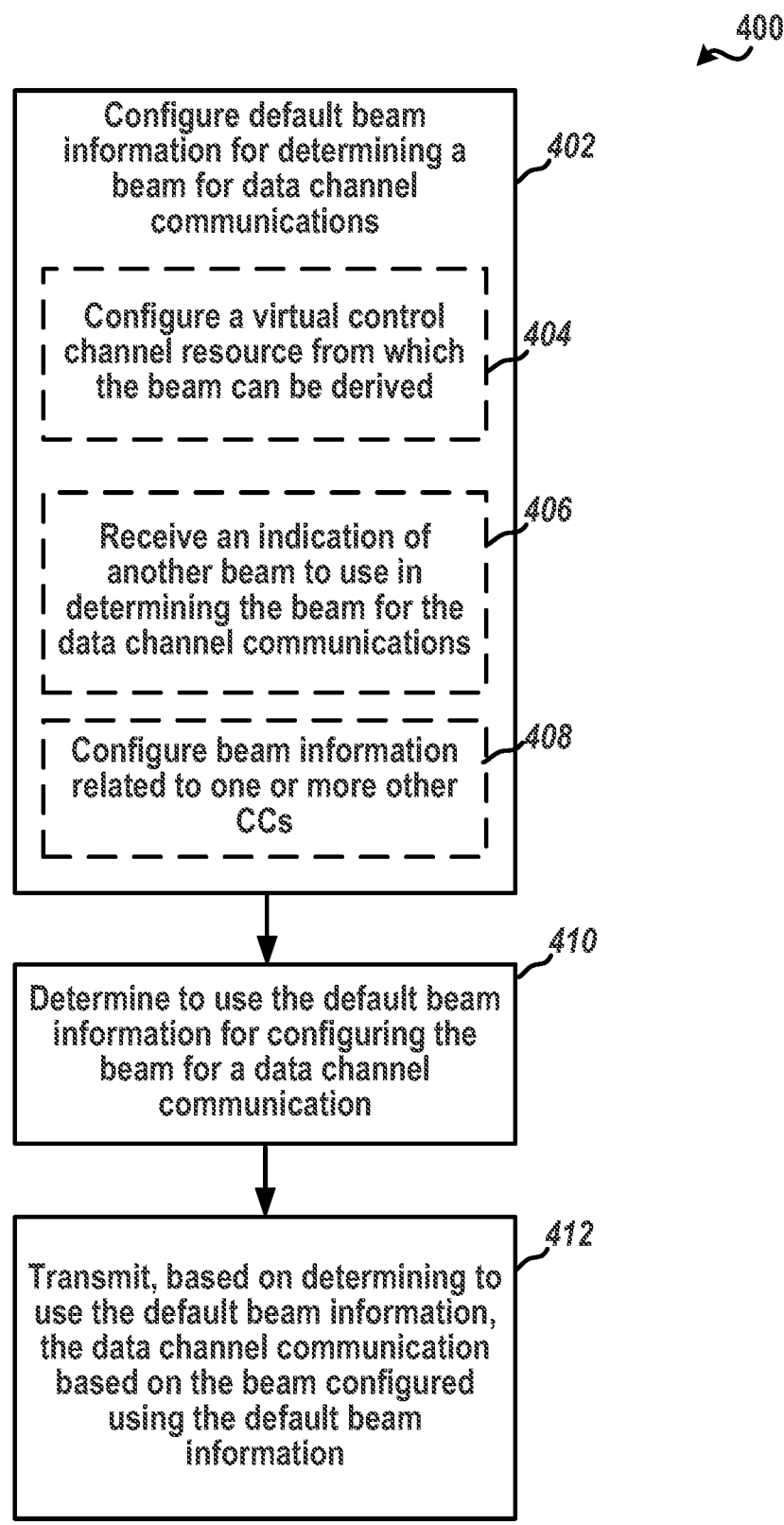
FIG. 4 is a flow chart illustrating an example of a method for configuring default beam information, in accordance with various aspects of the present disclosure.

FIG. 4 illustrates a flow chart of an example of a method 400 for configuring default beam information for generating beams for data channel communications. In an example, a UE 104 can perform the functions described in method 400 using one or more of the components described in FIGS. 1-2.

In method 400, at block 402, default beam information can be configured for determining a beam for data channel communications. In an aspect, default beam configuring component 252, e.g., in conjunction with processor(s) 212, memory 216, transceiver 202, communicating component 142, etc., can configure the default beam information for determining the beam for data channel communications. For example, the default beam configuring component 252 can configure the default beam information to be used for generating beams when other explicit beam information is unavailable. For example, beamforming component 254 can typically generate beams based on SRI, but there may be instances where SRI is undefined, such as where fallback DCI is received, which may not include SRI, and/or prior to SRS configuration from a base station 102. Hence, as the terms are used herein, the condition that no sounding beam is available (or the sounding beam is unavailable) is meant to include, e.g., circumstances where either no SRS is configured or an SRI indication is not provided in DCI. Although the main example described herein of a sounding beam is the SRS beam, aspects of the devices, systems and methods described herein are not necessarily limited to SRS implementations. In another example, it may be possible to use a beam of a recent actual PUCCH resource as the beam for transmitting the data channel communications. The actual PUCCH resource, however, may be infrequent (e.g., and can become stale for the current communication environment), such as when the semistatic PUCCH configuration is of insufficient frequency and may have occurred at some time in the past (e.g., many slots ago and may not be optimal to represent the current communication environment). In another example, the PUCCH may be absent (e.g., for a CC in a PUCCH group that does not carry PUCCH). Beamforming component 254 can utilize a beam generated from default beam information in such cases, for example, for data channel communications.

In an example, configuring the default beam information at block 402 may optionally include, at block 404, configuring a virtual control channel resource from which the beam can be derived. In an aspect, default beam configuring component 252, e.g., in conjunction with processor(s) 212, memory 216, transceiver 202, communicating component 142, etc., can configure the virtual control channel resource from which the beam can be derived. For example, default beam configuring component 252 can semistatically configure the default beam information as a virtual PUCCH resource, which can be considered as virtual based on control data not being transmitted over the resource. In an example, default beam configuring component 252 can reuse configuration procedures and/or attributes associated with actual PUCCH resources, including spatial information (e.g., transmit beam), in generating the virtual PUCCH resource as the default beam information.

For example, the default beam configuring component 252 can periodically or semi-persistently generate the virtual PUCCH resource, where a periodicity or other timing/event-related information for causing generation of the virtual PUCCH may be configured (e.g., by the base station 102 and/or similarly to a scheduling request (SR) or persistent/semi-persistent channel state information (CSI) report). In addition, in an example, communicating component 142 can exclude the virtual PUCCH resource from PUCCH resource sets such that ACK/NACK resource indicator (ARI) or other PUCCH indexing does not point to the virtual PUCCH resources as they are not used for transmission. In another example, communicating component 142 can include the virtual PUCCH resource from PUCCH resource sets, but can disable or disallow indexing such as ARI, or can enable indexing for special situations/purposes, such as updating the virtual resource beam.

Moreover, in an example, default beam configuring component 252 can determine the virtual PUCCH resource when determining a most recent PUCCH resource (e.g., virtual or actual) for determining the default beam for the data channel communications. In this regard, for example, the PUCCH duration may be relevant for virtual PUCCH resource where default beam configuring component 252 determines the most recent PUCCH resource based on a last symbol (e.g., OFDM symbol). In addition, for example, other attributes of the virtual PUCCH resource, such as assigned resource blocks, may not be necessary and may not be included in (or may otherwise be deleted from) the configuration. In yet another example, the attribute(s) may be set to zero or other unused values (e.g., number of resource blocks=0), which can indicate that the PUCCH resource is virtual in this regard.

In another example, configuring the default beam information at block 402 may optionally include, at block 406, receiving an indication of another beam to use in determining the beam for the data channel communications. In an aspect, default beam configuring component 252, e.g., in conjunction with processor(s) 212, memory 216, transceiver 202, communicating component 142, etc., can receive the indication of another beam to use in determining the beam for the data channel communications. For example, default beam configuring component 252 can receive the indication to use another beam from the base station 102. The base station 102 may signal the indication, for example, using radio resource control (RRC) layer signaling, a media access control (MAC) control element (CE), downlink control information (DCI), etc., and may signal the indication periodically or semi-persistently to update the beam to be used as the default beam. In one example, default beam configuring component 252 can receive an indication to use the same beam configuration as is used for a specific PUCCH resource (e.g., a resource for an SR or periodic CSI), and default beam configuring component 252 can accordingly set the default beam information based on the indicated beam (e.g., specific PUCCH resource) and/or an indicated beam configuration configured by the base station 102.

Moreover, as described, the default beam configuring component 252 can determine whether to configure the default beam information as the virtual PUCCH resource or using another beam based on one or more parameters. For example, the one or more parameters may relate to a time associated with the virtual PUCCH and the other beam such that the default beam configuring component 252 can use the most recent as the default beam information and/or use one or the other where a time difference achieves a threshold, etc. In an example, the time can be associated and measured as a real time, a number of slots or symbols, etc.

In yet another example, configuring the default beam information at block 402 may optionally include, at block 408, configuring beam information related to one or more other component carriers (CCs). In an aspect, default beam configuring component 252, e.g., in conjunction with processor(s) 212, memory 216, transceiver 202, communicating component 142, etc., can configure the beam information related to one or more other CCs. For example, the beam for the data channel communications can correspond to a CC on the UE 104 that is established with the base station 102, and the default beam information for the CC can be determined based on information (e.g., beam or otherwise) related to one or more other CCs (e.g., in the same group as the CC or not). Thus, in one example, default beam configuring component 252 can determine default beam information for the CC, though PUCCH may be absent in the CC, by leveraging information from the other CCs. In other examples, however, PUCCH may be used in the CC, but the default beam information for the CC can still be determined based on the one or more other CCs.

For example, each CC may have a subset of actual PUCCH resources, virtual PUCCH resources, other default beam information, etc., as described above, for determining a beam for data channel communications. For determining a beam for data channel communications on each CC, the default beam information can be based on a specific (actual or virtual) PUCCH resource, other default beam information, etc. defined for a specific reference CC, where information regarding which CC is the reference CC can be configured at the UE 104 (e.g., by base station 102 or otherwise). In one example, the CCs can be divided into groups, and a reference CC can be assigned for each group such that for each CC in the group, default beam information for each CC can be determined based on beam information of the reference CC. Moreover, default beam configuring component 252 can divide the CC into groups separately within a defined PUCCH group of CCs. Moreover, in an example, for a CC group having a single CC that carries PUCCH, this CC that carries PUCCH can be used as the reference CC for determining default beam information for the other CCs in the group. In addition, for example, default beam configuring component 252 can determine to exclude certain PUCCH resources in determining the default beam information, such as beam-sweeping transmissions. In a scenario where a CC group contains CCs from different bands, such as from sub-6 GHz (FR1) and millimeter-wave (FR2) bands, it is possible that the beams defined for a CC in one band cannot be meaningfully used in the other band. Thus, in this case a virtual PUCCH resource may be configured on a CC within a frequency band in which there is no actual PUCCH configured. This resource may be identified as a virtual resource (used only to determine the beam) by methods described above and may be associated with all the CC in the PUCCH group that lie in that frequency band. Alternatively, alternate partitions of the CCs other than those based on frequency band could be constructed or configured, and each of these partitions could be associated with a CC carrying a real or virtual PUCCH.

In method 400, at block 410, it can be determined (by, e.g., the UE) to use the default beam information for configuring the beam for a data channel communication. In an aspect, beamforming component 254, e.g., in conjunction with processor(s) 212, memory 216, transceiver 202, communicating component 142, etc., can determine to use the default beam information for configuring the bean for the data channel communication. In an example, beamforming component 254 can determine to use the default beam information based at least in part on determining that other beam information is not configured or indicated (e.g., the other beam information is unavailable, absent, etc.). For example, this may include determining a SRI as unavailable, a PUCCH resource as unavailable or expired (e.g., determined as having an associated time that achieves a threshold from a current time), etc. In this regard, beamforming component 254 can generate the beam for the data channel communications using the default beam information, which may include a virtual PUCCH resource or other configured beam, beam information from another CC, etc., as described.

In method 400, at block 412, the data channel communication, based on the beam configured using the default beam information, can be transmitted based on determining to use the default beam information. In an aspect, communicating component 142, e.g., in conjunction with processor (s) 212, memory 216, transceiver 202, etc., can transmit, based on determining to use the default beam information, the data channel communication based on the beam configured using the default beam information. For example, communicating component 142 can transmit the beamformed data channel communication by adjusting communication properties of multiple antennas of the UE 104 to achieve a directional beam generated by the beamforming component 254.

In accordance with the described techniques, a base station (e.g., 102) may allocate communication resources for a UE (e.g., 115). Examples of such communication resources are described further below and include PUSCH resources, physical uplink control channel (PUCCH) resources, physical downlink shared channel (PDSCH) resources, and physical downlink control channel (PDCCH) resources. In some cases, the communication resources may be associated with a transmission (e.g., which may be sent using a given transmit beam and received using a given receive beam). As described further below, the UE 115 and base station 102 may identify a default uplink transmit beam to be used by the UE 115 for communicating uplink transmissions based at least in part on the allocated communication resources (e.g., or the given transmit beam and/or the given receive beam). The UE 115 and base station 102 may identify a triggering condition for the UE 115 to use the default uplink transmit beam for communications. For example, the UE 115 may determine that it has not received an indication from the base station 102 of a particular uplink beam to use, or a beam indication from the base station 102 may have been received too late for the UE 115 to process the indication and configure the indicated uplink beam in time.

Figure 5:
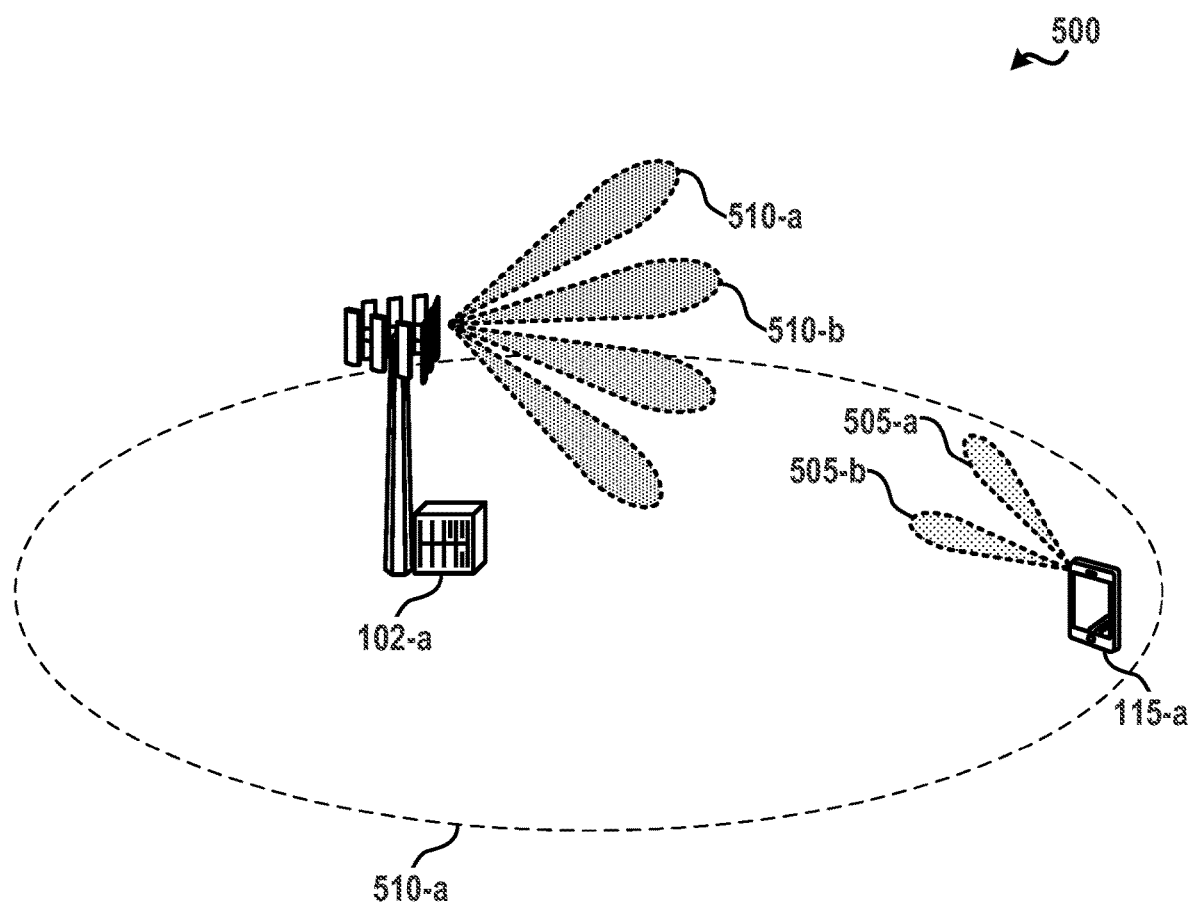
FIG. 5 illustrates an example of a wireless communications system that supports uplink beam assignment in accordance with aspects of the present disclosure.

FIG. 5 illustrates an example of a wireless communications system 500 that supports uplink beam assignment in accordance with various aspects of the present disclosure. Wireless communications system 500 includes a base station 102-a and a UE 115-a, each of which may be an example of the corresponding device described with reference to FIG. 1.

Wireless communications system 500 may operate in frequency ranges that are associated with beamformed transmissions between base station 102-a and UE 115-a. For example, wireless communications system 500 may operate using mmW frequency ranges (e.g., or other frequency ranges). As a result, signal processing techniques, such as beamforming, may be used to combine energy coherently and to overcome path losses.

By way of example, base station 102-*a* may contain multiple antennas. In some cases, each antenna may transmit a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the coverage area 110-*a* of the base station 102-*a* or otherwise benefit the wireless communications system 500.

Transmit beams 505-*a* and 505-*b* represent examples of beams over which data may be transmitted. Accordingly, each transmit beam 505 may be directed from UE 115-*a* toward a different region of the coverage area and in some cases, two or more beams may overlap. Transmit beams 505-*a* and 505-*b* may be transmitted simultaneously or at different times. In either case, a base station 102-*a* may be capable of receiving one or more transmit beams 505 via respective receive beams 510-*a* and 510-*b*.

In one example, UE 115-*a* may form one or more transmit beams 505. Similar to base station 102-*a*, UE 115-*a* may contain multiple antennas. The transmit beams 510-*a* and 510-*b* may each be received using one of the receive beams 510-*a* and 510-*b* (e.g., UE 115-*a* may be positioned within wireless communications systems 500 such that base station 102-*a* receives both beamformed transmit beams 505). Such a scheme may be referred to as a receive-diversity scheme. In some cases, the receive beams 510 may receive a single transmit beam 505-*a* (e.g., receive beam 510-*a* may receive the transmit beam 505-*a* with various pathloss and multipath effects included). That is, each antenna of base station 102-*a* may receive the transmit beam 505-*a* which has experienced different path losses or phase shifts (e.g., different phase shifts due to the different path lengths between the base station 102-*a* and the respective antennas of the UE 115-*a*) and appropriately combine the received signals represented by receive beams 510-*a* and 510-*b*. A transmit beam 505 and a corresponding receive beam 510 may be referred to as a beam pair link.

In some cases, UE 115-*a* may identify a transmit beam 505 to use for a PUSCH transmission based on a beam indicator received from base station 102-*a*. For example, the beam indicator may be an SRI or a transmission configuration identifier (TCI), each of which may be carried in a downlink control information (DCI) transmission from base station 102-*a*. A beam indicator may implicitly or explicitly indicate to the UE 115-*a* which uplink or downlink beam to use for subsequent uplink or downlink communications. For example, an SRI may indicate to the UE 115-*a* to use a particular uplink beam that was used for a previously transmitted SRS transmission. Alternatively, a TCI may indicate to the UE 115-*a* to use a particular downlink receive beam that was used for a previously received reference signal (e.g., a CSI-RS) or a particular uplink transmit beam such as a beam for SRS. Thus, in some examples, a TCI may be considered as a generalization of an SRI.

As an example, UE 115-*a* may be configured with a SRS resource set comprising one or more SRS resources, each of which is transmitted over a respective transmit beam 505 (e.g., for channel sounding). Base station 102-*a* may process the SRS transmission(s) and indicate a preferred transmit beam 505 for uplink communications from UE 115-*a* in the form of an SRI. The SRI may represent an index into one of the multiple SRS resources within the SRS resource set (where each SRS resource is associated with a respective transmit beam 505). A PUSCH transmission may be quasi-co located (i.e., use the same transmit beam 505) as the SRS sent on the resources indicated by the SRI. Thus, in cases in which the SRI is received, UE 115-*a* may know which transmit beam 505 to use for communicating with base station 102-*a*.

However, the uplink grant (e.g., which may be contained in the DCI transmission) may not always contain SRI, in which cases the transmit beam 505 for the PUSCH transmission may not be specified. For example, the DCI transmission may be a fall-back DCI transmission (e.g., which may not contain an SRI field as part of the uplink grant). In other cases (e.g., for semi-persistent scheduled (SPS) uplink transmissions), the PUSCH resources may not have an associated grant which can include the SRI. That is, while the SPS activation (e.g., which may trigger the use of resources preconfigured via radio resource control (RRC) signaling) may include a beam indication, the indicated transmit beam 505 may not be suitable for subsequent uplink transmissions (e.g., due to changing channel conditions). In other examples, UE 115-*a* may not be configured to transmit SRS (e.g., in which case the transmit beam 505 will be unspecified because base station 102-*a* does not have SRS resources for which to transmit a beam indicator). In such cases (e.g., among others), aspects of the following may be used to identify a default transmit beam 505. The identification of such cases may be referred to as a triggering condition for the UE 115-*a* to use a default uplink transmit beam.

For example, the default transmit beam 505 may be associated with a recent uplink or downlink transmission (e.g., or resources which are configured to carry such transmissions). For example, base station 102-*a* may configure resources for UE 115-*a* to use for uplink transmissions such as scheduling request (SR) transmissions. While such resources may not be used in some cases (e.g., because UE 115-*a* does not have data to transmit over these resources), the resources may still be used to identify a default transmit beam 505 in aspects of the present disclosure. In some cases, the transmission or resources may be semi-statically configured (e.g., SPS resources). Additionally or alternatively, the resources may be dynamically scheduled. Dynamically scheduled resources may in some cases be associated with increased transmit beam 505 ambiguity (e.g., because of the possibility of UE 115-*a* not receiving the grant scheduling the resources), though such ambiguity may be addressed using aspects of the following.

In accordance with some techniques described herein, the default transmit beam 505 may be used whenever SRS or SRI is absent (e.g., or if the SRI arrives too late to be useful). For example, UE 115-*a* may need to receive the SRI prior to some timing threshold in order to program the uplink transmit beam 505 in response to the SRI. Thus, the timing threshold may in some cases vary between UEs 115 (e.g., based on a beam-switching capability of the UE 115).

In a first set of examples, the default transmit beam 505 may be identified based on one or more downlink transmissions or resources. For example, the default transmit beam may be selected based on the beam that UE 115-*a* uses to receive a recent PDCCH CORE SET (coreset). For example, the recent PDCCH coreset may be a coreset that is received prior to some threshold time as described above. In aspects of the present disclosure, a PDCCH coreset may be selected from a set of candidate PDCCH coresets (e.g., based on an index of the PDCCH coreset). For example, UE 115-*a* may in some cases identify a PDCCH coreset having a lowest index among the candidate PDCCH coresets. In some cases, UE 115-*a* may restrict the candidate pool based on a reception time of the PDCCH coreset(s). For example, UE 115-*a* may pick the coreset within a configured search space or a configured candidate whose reception completes at a recent (e.g., the most recent) OFDM symbol. In the case that multiple PDCCH coresets are received during the OFDM symbol, UE 115-*a* may employ a tie-breaking procedure (e.g., may select the lowest indexed coreset, the highest indexed coreset, etc. among the multiple PDCCH coresets). Using the recently received prior PDCCH coreset may in some cases eliminate (e.g., or mitigate) the need for beam-switching between PDCCH and PUSCH (e.g., which may save processing power, may reduce latency, or may provide other such benefits for UE 115-*a*).

As another example, the default transmit beam 505 may be selected based on the beam of a recent channel state information reference signal (CSI-RS) transmission (e.g., which may be a semi-persistent CSI-RS, a persistent CSI-RS, or an aperiodic or dynamically scheduled CSI-RS). CSI-RS may be used to perform channel sounding in the downlink Thus, CSI-RS may be transmitted over one (or more) beams, and UE 115-*a* may select one of these beams to use in identifying the default transmit beam 505 (e.g., a most recent beam, a lowest indexed beam, etc.). However, some such rules for selecting one of the beams may be arbitrary (e.g., may not be guaranteed to select the best beam because base station 102-*a* may not know which beam is the best without feedback from UE 115-*a*). However, in some cases only a single CSI-RS beam may be used (e.g., to measure frequency selectivity within the channel), in which case the arbitrary nature of the selection process may be obviated.

As another example, the default transmit beam 505 may be selected based on the beam of a recent prior PDSCH transmission. Such a scheme may in some cases suffer from the issue of missing the grant for the PDSCH (e.g., as discussed above). However, this issue may be mitigated if there is ongoing SPS downlink PDSCH (e.g., which may not require grants), in which case the beam may be used to select to the default transmit beam 505. Such SPS downlink PDSCH may in some cases use a recent PDCCH transmission to define its own beam. However, this approach may not be equivalent to directly using the recent PDCCH beam (e.g., because of different periodicities for the PDCCH and SPS downlink PDSCH).

In some cases, UE 115-*a* may use a combination of the downlink-based schemes described above (e.g., the beam of a recent transmission, where the transmission may be PDCCH, PDSCH, CSI-RS, or some subset thereof). By way of example, UE 115-*a* may select only the SPS downlink PDSCH as a default, but may instead select the default transmit beam 505 based on a recent CSI-RS beam if CSI-RS uses only one beam.

In some examples, these downlink-based schemes may be more suited for UEs 115 with uplink/downlink beam correspondence (e.g., reciprocity) in which downlink receive beams are also suitable for uplink transmissions. However, not all UEs 115 may support such reciprocity. Such UEs 115 (e.g., as well as UEs 115 supporting reciprocity in some cases) may benefit from uplink-based schemes.

Thus, in a second (e.g., complementary) set of examples, the default transmit beam 505 may be identified based on one or more uplink transmissions or resources. As an example, the default transmit beam 505 may be selected based on the beam of a recent PUCCH resource (e.g., which may be a configured resource which is not actually used for carrying a transmission such as an unused SR resource or a resource carrying a PUCCH transmission). However, using the actually transmitted PUCCH resource may cause ambiguity between UE 115-*a* and base station 102-*a* (e.g., because of the missed transmission issue discussed above in relation to the grant-based downlink transmissions). PUCCH resources may in some cases be configured for one or more of multiple purposes (e.g., SR, periodic, semi-persistent, or aperiodic channel quality indicator (CQI) reports, beam failure recovery, etc.). PUCCH resources configured for each of these purposes may in some cases be associated with different periodicities. Further, within SR resources, separate PUCCH resource configurations may be present for SR for each of a plurality of different logical channels. In some cases, the default transmit beam 505 may be selected based on the PUCCH resources associated with a specific one of these purposes (e.g., SR resources) or may be selected based on the PUCCH resources associated with a recent transmission among all of these purposes. For example, the recency of the transmission may be defined with a time granularity of a slot-basis or an OFDM symbol basis. As discussed with respect to the PDCCH coresets, any ties among PUCCH resources may be resolved by selecting based on the PUCCH resource index (e.g., or by the frequency domain index of the resource). In some cases, the PUCCH resource for beam-failure recovery may be beam-swept (e.g., and hence unsuitable for selecting default transmit beam 505).

Additionally or alternatively, the PUCCH resource may be dynamically selected (e.g., for ACK transmissions). In some cases, multiple ACK resources each with a different beam may be configured, amongst which one is selected for transmitting the ACK. Thus, in some cases the default transmit beam 505 may be selected based on the beam corresponding to a recently transmitted ACK. However, because the ACK transmission may itself generally be a dynamic transmission (e.g., based on a dynamically scheduled PDSCH transmission), such a scheme may suffer from the missed transmission issue discussed above.

In another example, the beam of a recent (prior) SRS resource (e.g., a persistent, semi-persistent, or aperiodic SRS resource) may be used. Such a scheme may experience similar benefits and drawbacks to that discussed with reference to the CSI-RS scheme. For example, the dynamically scheduled SRS may suffer from missed transmission issues, and it may be difficult to resolve the arbitrary selection of an SRS resource (e.g., because UE 115-*a* may not know which SRS resource corresponds to the best beam in the absence of an SRI from base station 102-*a*). In another example, the beam of a recent PUSCH transmission that is based on an SRI may be used.

As with the downlink schemes, UE 115-*a* may use a combination of the uplink-based schemes described above (e.g., the beam of a recent transmission, where the transmission may be SRS, PUCCH, PUSCH, or some subset thereof). Additionally or alternatively, UE 115-*a* may use some hybrid of the downlink and uplink-based schemes discussed above (e.g., may use a recent transmission, regardless of whether it was an uplink or downlink transmission). Further, in some cases, UE 115-*a* may be able to switch between various schemes described above (e.g., where the switching may be done autonomously or may be based on signaling received from base station 102-*a*).

Aspects of the present disclosure also relate to handling updates for the default uplink transmit beam 505. For example, the default uplink transmit beam 505 may be associated with a previous transmission (or reception or allocated resource). However, the beam for that resource or transmission may be semi-statically updated (e.g., by a MAC-CE or RRC signaling) after the resource has been used but prior to transmission of the PUSCH over default transmit beam 505. In some such cases, semi-static updates may occur at the beginning of the slot identified by an update timeline. In accordance with the described techniques, UE 115-a may use the beam indicated by the updates in the slot carrying the PUSCH transmission to identify the default uplink transmit beam 505 for the PUSCH transmission. Alternatively, UE 115-a may use the updated default uplink transmit beam 505 for the PUSCH transmission immediately following the slot carrying the resource used to select the updated default uplink transmit beam 505.

Aspects of the present disclosure also relate to selection of a default uplink transmit beam 505 for SPS uplink transmission and/or grant-free operation. For example, the beam of the first uplink SPS PUSCH transmission may be based on the SPS activation grant (e.g., as for the uplink non-SPS PUSCH). For subsequent SPS PUSCH transmissions, the default uplink transmit beam 505 may be selected using any of the schemes outlined above. In some cases, the SPS resource grant may be overridden by an explicit resource grant in the same slot (e.g., or with a grant overlapping or coinciding in time and/or frequency). Such a grant may also override the default transmit beam 505 (e.g., in accordance with the rules for non-SPS PUSCH outlined above). In some cases, such overrides may be made persistent for future SPS occasions. For example, the persistence duration may last until the next override, may last for a fixed (e.g., configurable) duration, etc. The handling for grant-free uplink transmissions may resemble (e.g., or be identical to) the handling for SPS uplink transmissions. The difference between the two may be that the SPS uplink resources always carry transmissions (e.g., for voice communications) while the grant-free transmission resources may be available but only used if there is data to transmit. Thus the beam selection may resemble that of SPS, but the default transmit beam 505 may go unused if there is no data to send.

Aspects of the present disclosure also relate to beam selection during or after random access channel (RACH) transmissions. For example, the RACH procedure may use a single beam. UE 115-a may select a suitable beam among the synchronization signal (SS) beams used for all RACH messages (e.g., including ACK for message 4 (Msg4-ACK)). After Msg4-ACK, the selected suitable beam may continue to be used as the default uplink transmit beam 505 until other resources (e.g., PDCCH coresets, PUCCH resources, SRS, CSI-RS) are RRC configured. For example, the RRC configuration may include TCI states (e.g., beams) After this configuration, the schemes described above may be applied. In some cases, the PDCCH coreset scheme may apply during (e.g., and immediately after) RACH, with the understanding that the remaining minimum system information (RMSI) coreset corresponding to the suitable SS beam that UE 115-a chose for RACH is the only configured coreset during this time. During RRC configuration, if non-fallback DCI including beam indication fields (e.g., TCI for downlink grants and SRI for uplink grants) is used, these fields may be set to default values, may be set to convey some other information, or may be ignored.

For UEs 115 with uplink/downlink beam correspondence, the suitable SS beam identified may be used as default beam for both uplink and downlink transmissions until a subsequent RRC configuration (e.g., including coresets, TCI states, etc.) is received. For UEs 115 without uplink/downlink beam correspondence, the default beam for uplink transmissions may be the beam used to send uplink RACH messages (e.g., msg1, msg3, both) that resulted in a successful completion of RACH procedure. While msg1 may be sent on a resource that is associated with the identified suitable SS beam, the msg1 beam itself may be derived from this SS beam only for UEs 115 with uplink/downlink beam correspondence and may be a different beam for UEs 115 without this correspondence. Further, if beam training is allowed during the RACH procedure, then the default beam used after the RACH procedure and prior to receipt of a subsequent RRC configuration may be the beam identified as a result of this beam training. A separate default beam may be identified in this manner for uplink and downlink transmissions.

In cases in which SRS is not configured, the techniques described herein (e.g., allowing for selection of the default uplink transmit beam 505 without SRS) may allow the SRI field to be dropped from the DCI transmissions (e.g., which may reduce signaling overhead). Codebook-based precoding may not be supported in some such cases (e.g., because the precoder operates on SRS ports, which would not be specified in the case of uplink beam assignment without SRS configuration).

The SRS is a reference signal transmitted by the UE in the uplink direction which is used by the base station to estimate the uplink channel quality over a wider bandwidth. The base station may use this information for uplink frequency selective scheduling. The base station can also use SRS for uplink timing estimation as part of timing alignment procedure, particularly in situations like there are no PUSCH/PUCCH transmissions occurring in the uplink for a long time in which case, the base station relies on SRS for uplink timing estimation. SRS may or may not be transmitted in the same physical resource blocks where PUSCH is transmitted as SRS may stretch over a larger frequency range.

SRS transmissions may occur as single SRS, periodic SRS and aperiodic SRS. Single SRS and periodic SRS may be referred to as "trigger type 0" SRS transmissions that are configured by radio resource control (RRC) signaling. Aperiodic SRS transmission may be referred to as "trigger type 1" SRS transmission that is configured by RRC, but triggered by DCI. A base station may configure a UE with UE specific SRS configuration to provide the UE with time domain (subframes) as well as frequency domain resources. In one example, PUSCH may use SRS beams when SRS is configured and SRI is present.

However, in certain circumstances, only 1 SRS may be configured, which may require RRC to update a PUSCH beam. This may be slow and inefficient, as RRC requires time and resources to execute. In other circumstances, SRS and/or SRI may be absent altogether. As many PUSCH power control parameters are tied to SRI, further inefficiencies are introduced. While a PUCCH beam may be updatable by MAC-CE, not all UEs may be equipped with this capability. If a PUSCH default beam (when SRS/SRI absent) is based on PUCCH, UEs without the capability will need RRC to update the default PUSCH beam. Accordingly, technologies and techniques are disclosed herein to provide a more efficient way to establish and/or update PUSCH beam.

MAC-CE Updating of SRS Beams

Figure 6:
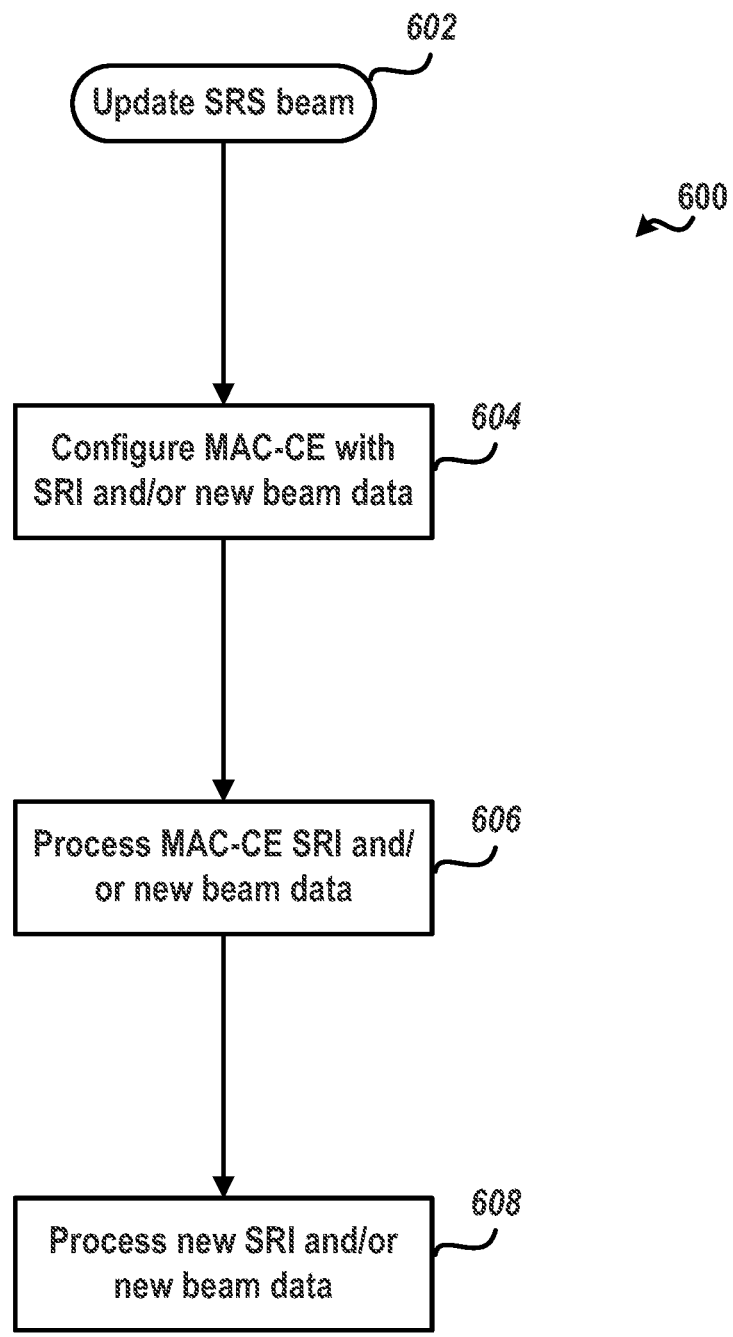
FIG. 6, shows a process is shown for updating sounding reference signal (SRS) resource indicator (SRI) by configuring media access control (MAC)-control element (CE) with SRI and/or new beam information/data under an illustrative embodiment.

In some illustrative embodiments, a MAC-CE may be configured to allow updating of SRS beams. For example, MAC-CE may be configured (by a UE or other suitable device or system) to contain SRI and/or new beam information. In the embodiment of FIG. 6, an illustrative process is shown for updating SRI. In block 602, an SRS beam update process is started, where in block 604, the MAC-CE is configured (by a UE or other suitable device or system) with SRI and/or new beam information/data. The new beam information/data may be configured as a pointer, indicator and/or a list of transceiver control interface (TCI) states/ beams that are configured for SRS or for other channels. For example, a table or list may include, but is not limited to, PUCCH-SpatialRelationInfo, SRS-SpatialRelationInfo, and TCI-statesPDCCH. In block 606, the MAC-CE SRI and/or beam information is processed (by a UE or other suitable device or system). In an illustrative embodiment, the processed information/data may include information elements (IEs) that point to SSB-index, NZP-CSI-RS-index, SRSResource-index, and so on. In some illustrative embodiments, the new beam information could explicitly point to a beam index, such as SSB-index, NZP-CSI-RS-index, SRS-resource index, and so on. In block 608, the new SRI and/or new beam data is processed (by a UE or other suitable device or system) to define one or more new beams Under these disclosed examples, new beams may be defined without needing to use any new RRC configuration parameters and/or IEs.

Figure 7:
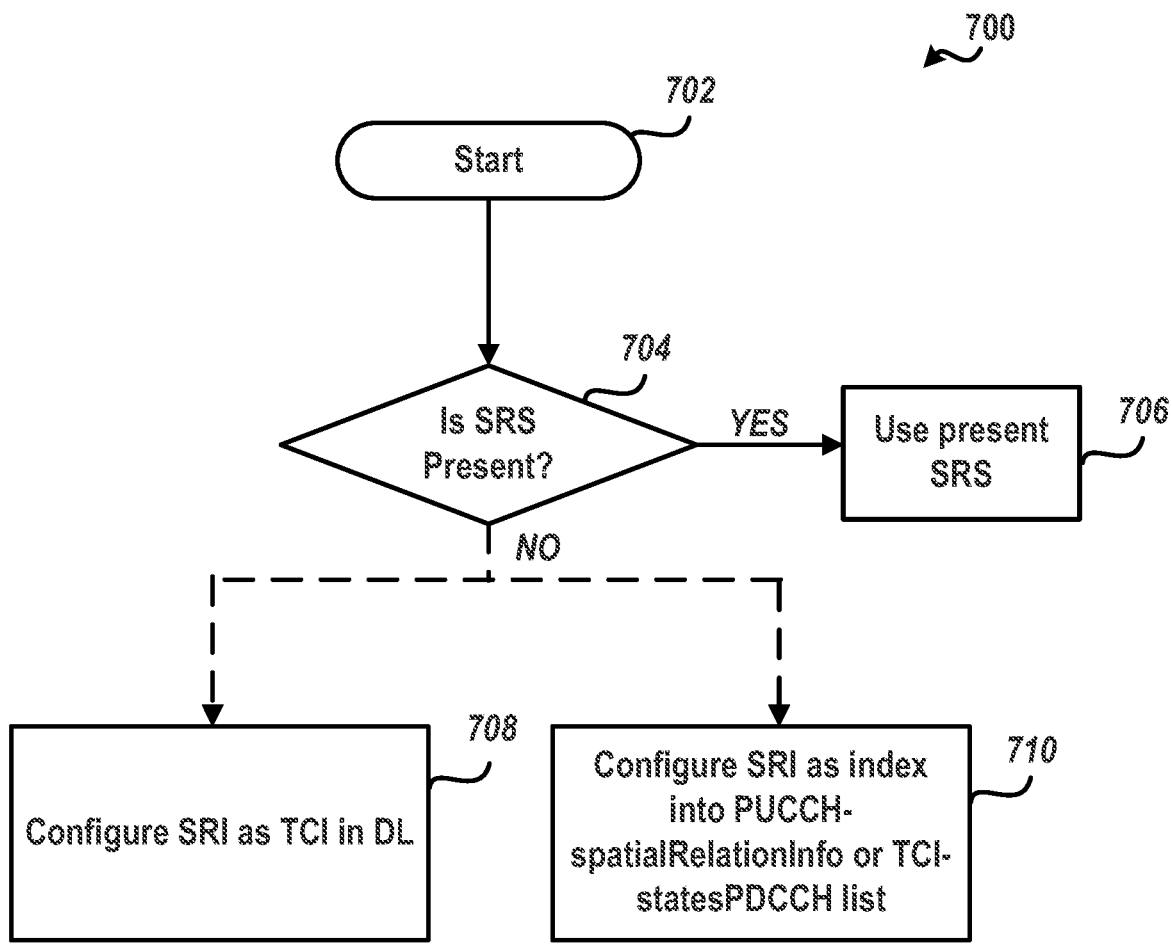
FIG. 7 shows a process for configuring SRI when SRS is absent, under an illustrative embodiment.

Turning to FIG. 7, the figure shows an illustrative process 700 for configuring SRI when SRS is absent. After starting in block 702, a determination is made in decision block 704 if the SRS is present. If so ("YES"), the existing (present) SRI is used in block 704. If not ("NO"), the process has an option of moving to block 708, where the SRI may be configured to point to an alternate beam index. In one example, SRI may be interpreted as TCI in DL. Alternately or in addition, the process 700 may move to block 710, where the SRI may be interpreted as an index into PUCCH-spatialRelationInfo or TCI-statesPDCCH list. Depending on the configuration used, SRI field-length may be defined as 3 bit or 6 bit. The process 700 of FIG. 7 may be used after RACH procedure prior to SRS configuration, or when SRS is de-configured/de-activated.

Figure 8A:
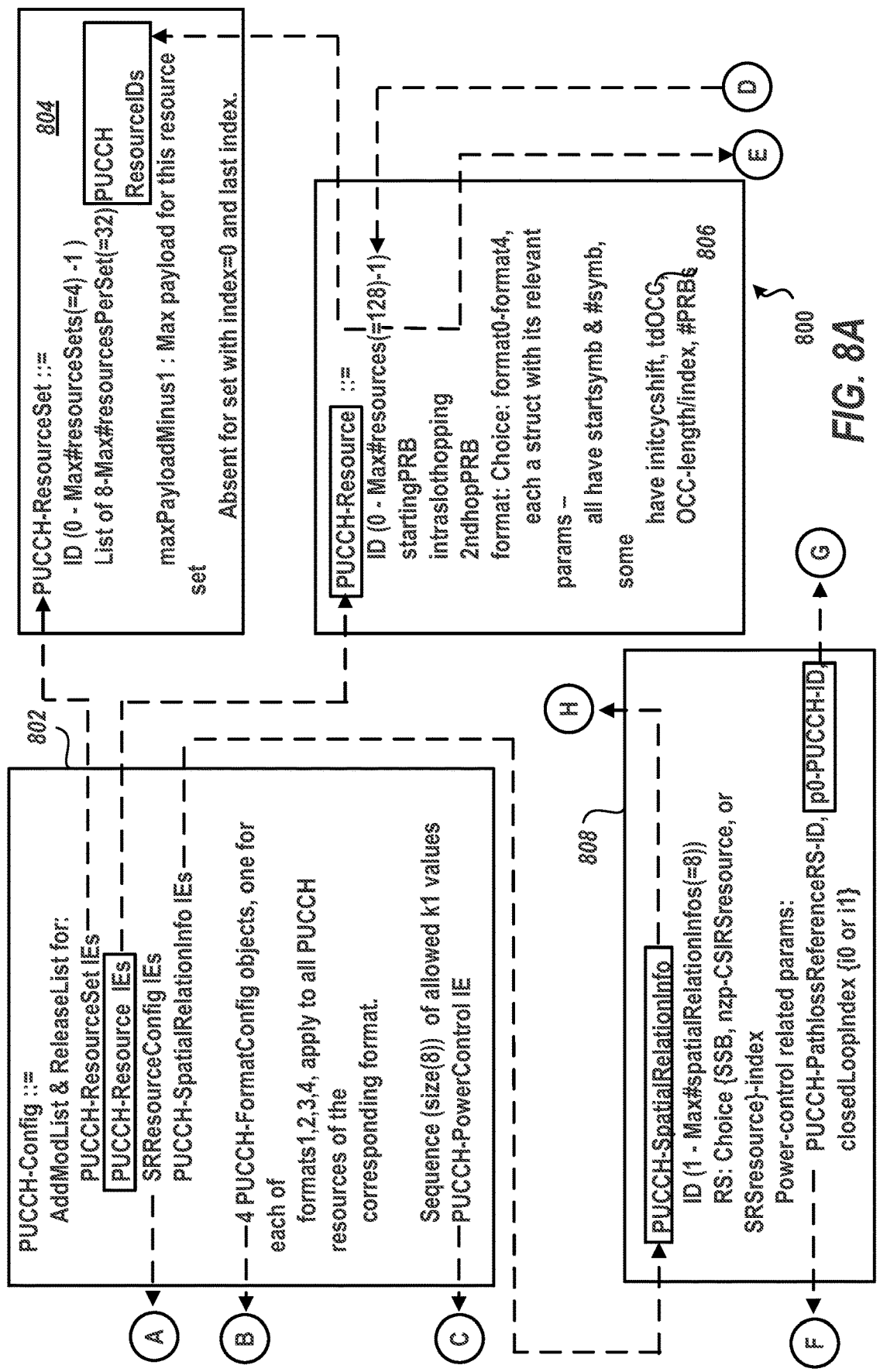
FIGS. 8A-C show an operating environment including resource modules for beam configuration in radio resource control (RRC) and/or MAC-CE under an illustrative embodiment.
Figure 8B:
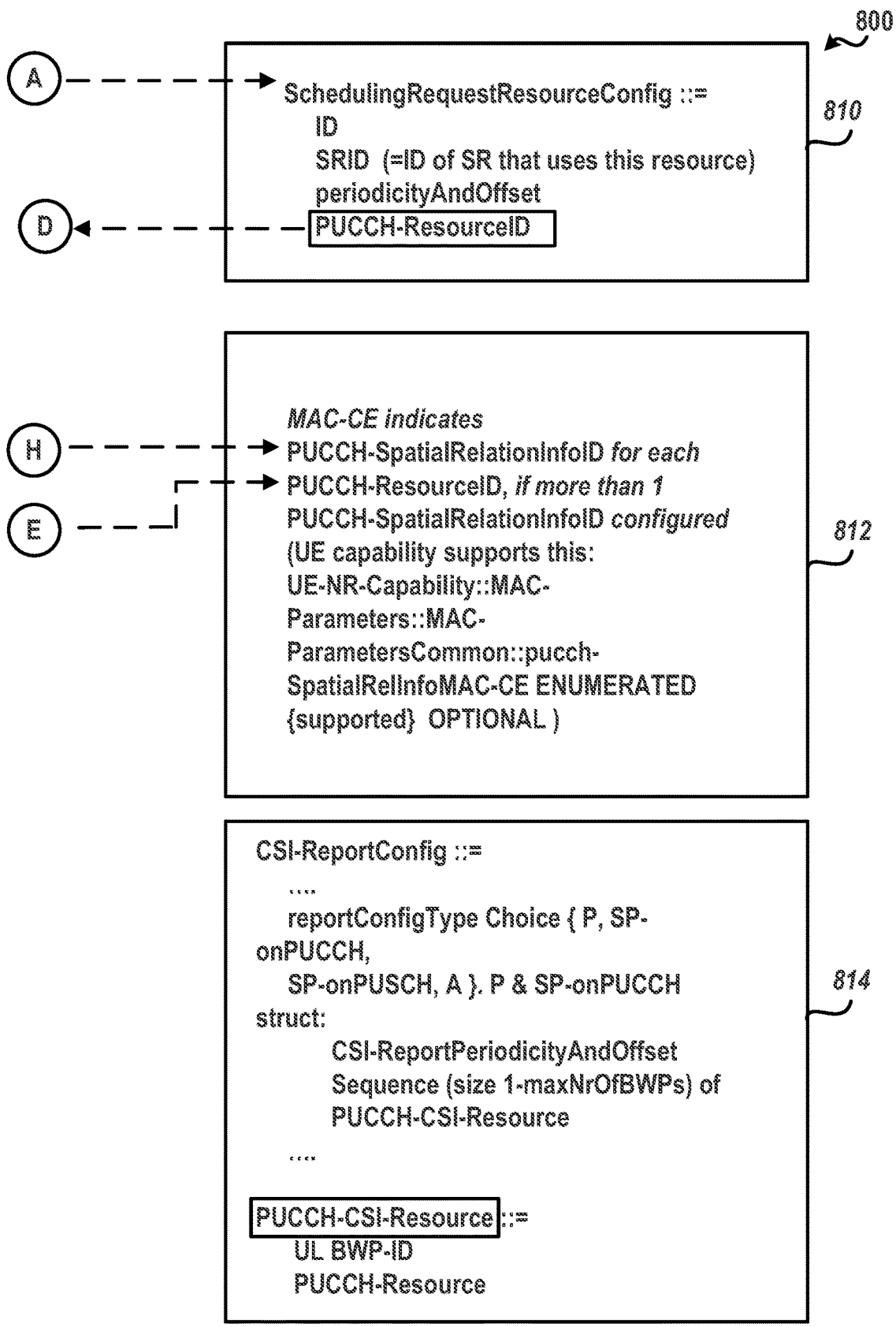
Figure 8C:
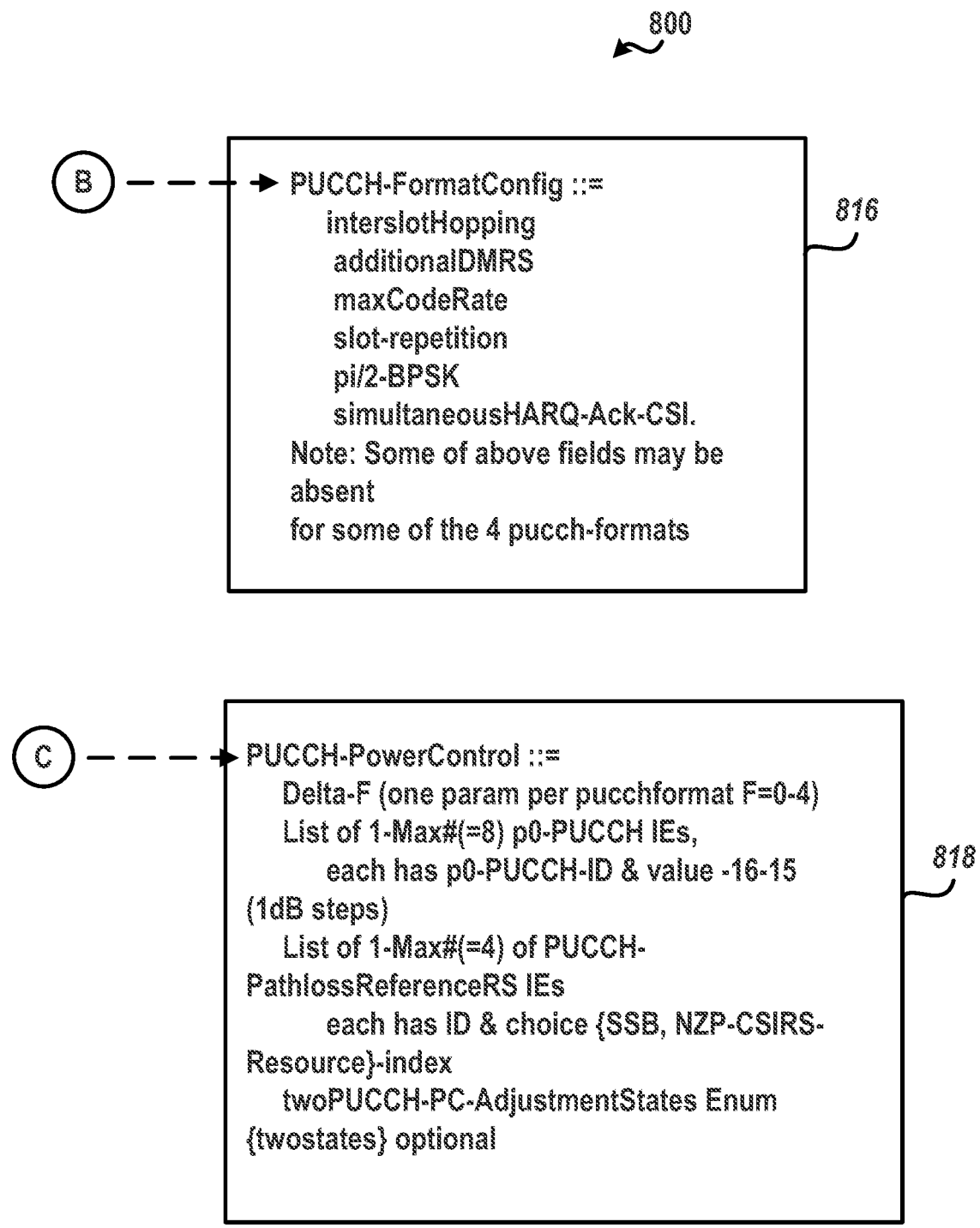

Turning to FIGS. 8A-8C, an operating environment 800 is disclosed, showing related resource modules for beam configuration in RRC and/or MAC-CE. While the modules 802-818 are illustrated as separate modules, those skilled in the art will recognize that the modules may be arranged differently and/or combined as modules and/or sub-modules, to suit a particular application. During operation, each of the modules (802-818) is configured to be executed via a processing apparatus or multiple processing apparatuses (e.g., 212, 312). In this example, PUCCH resource configuration list module 802 carries a list of PUCCH resources and/or parameters for PUCCH beam configuration. The PUCCH resource list may include, but is not limited to, PUCCH-ResourceSet IEs, PUCCH-Resource IEs, SRResourceConfig IEs, and/or PUCCH-SpatialRelationInfo IEs. Resource list module 802 may also include a plurality (e.g., 4) of PUCCH-FormatConfig objects, where each object may be applied to all PUSCH resources of the corresponding formats (e.g., 1, 2, 3, 4).

In some illustrative embodiments, the spatial relation information object (PUCCH-SpatialRelationInfo) indicates a beam reference signal whose beam is to be used whenever the object is referenced. The spatial relation object (PUCCH-SpatialRelationInfo) may be further defined in spatial relation information module 808 as shown, and include an identification (ID), reference signal (RS), and power control parameters, which are further defined in the illustrative embodiment of FIG. 9, discussed below. The RS information of module 808 may indicate which beam is being referenced during beam formation.

PUCCH resource set IEs of PUCCH resource configuration list module 802 may be further defined in PUCCH resource set module 804 and may include, but is not limited to, resource set ID, a list of maximum number of resources (Max #resourcesPerSet) for PUCCH Resource IDs, and a maximum payload for specified resource sets. PUCCH resource IEs of PUCCH resource configuration list module 802 may be further defined in PUCCH Resource module 806, and may include, but is not limited to, PUCCH Resource ID, starting physical resource block (PRB), intra-slot hopping information, $2^{nd}$ hop PRB and PUCCH format information.

Scheduling request configuration IEs of PUCCH resource configuration list module 802 of FIG. 8A may be further defined ("A") in scheduling request resource configuration object 810 of FIG. 8B that may include, but is not limited to, an ID, a scheduling request ID (SRID), periodicity and offset, and PUCCH resource ID. The PUCCH resource ID of scheduling request resource configuration object 810 may refer back ("D") to the PUCCH resource ID of PUCCH of PUCCH Resource module 806, as shown in the figures. The PUCCH format configuration objects of PUCCH resource configuration list module 802 of FIG. 8A may be further defined ("B") in PUCCH format configuration module 816 of FIG. 8C that may include, but is not limited to, inter-slot hopping information (interslotHopping), additional uplink demodulation reference signal information (additionalDMRS), maximum code rate information (maxCodeRate), slot repetition information (slot-repetition), binary phase shift keying (pi/2-BPSK), AND simultaneous transmission periodic CSI and HARQ-ACK feedback information (simultaneousHARQ-Ack-CSI) where HARQ refers to hybrid automatic repeat request. PUCCH power control IE of PUCCH resource configuration list module 802 of FIG. 8A may be further defined ("C") in PUCCH module 818 of FIG. 8C and may include, but is not limited to, power control information, which is discussed in greater detail in connection with FIG. 9.

Additional modules include a MAC-CE module 812 of FIG. 8B, wherein the MAC-CE module 812 may include, but is not limited to PUCCH spatial relation information ID (PUCCH-SpatialRelationInfoID) for each beam, which is provided ("H") from in PUCCH spatial relation information module 808 of FIG. 8A, PUCCH resource ID (PUCCH-ResourceID) if more than 1 beam is utilized, and PUCCH spatial relation information ID (PUCCH-SpatialRelationInfoID). Additional parameters may be included as shown in the figure. A channel status information (CSI) report configuration module 814 of FIG. 8B may also be configured to report information and resources as shown, including PUCCH resources.

The MAC-CE module 812 of FIG. 8B is shown to map a specific PUCCH resource to a specific beam (PUCCH-SpatialRelationInfoID). In scenarios where multiple PUCCH resources share the same beam, it requires separate MAC-CEs for each of them, which may involve large amount of overhead, especially if large number of PUCCH resources are configured. To alleviate this, alternative MAC-CEs may be specified that associate multiple PUCCH resources with the same beam. For example, the MAC-CE may contain the ID of one or more PUCCH resource sets, rather than the ID of a PUCCH resource, and the beam to be used for all PUCCH resources in those resource sets. Alternatively, a MAC-CE may associate all resources for a particular physical channel with a particular beam; e.g. all PUCCH resources, all SRS resources or all PDCCH CORE-SETS. A separate MAC-CE may be designed for each of these physical channels, or a single MAC-CE may include an index to identify the physical channel and the associated beam. The bitfield representing the beam index may be interpreted differently depending on the physical channel identified, for example, as an index into PUCCH-Spatial-RelationInfo information element (IE) for PUCCH and into TCI-statesPDCCH IE for PDCCH. The MAC-CE may also address subsets of the physical channel resources, similar to PUCCH-resource sets for the case of PUCCH, with indication of the subset(s) (e.g., PUCCH-resourceSetID(s) or SRS-resourceSetID(s)) included in the MAC-CE.

With regard to power control, uplink power control determines the transmit power of the different uplink physical channels or signals. For PUSCH, a UE first scales a linear value $\hat{P}_{PUSCH,f,c}(i,j,q_d,l)$ of the transmit power $P_{PUSCH,f,c}(i,j,q_d,l)$ by the ratio of the number of antenna ports with a non-zero PUSCH transmission to the number of configured antenna ports for the transmission scheme. The resulting scaled power is then split equally across the antenna ports on which the non-zero PUSCH is transmitted. If a UE transmits a PUSCH on carrier f of serving cell c using parameter set configuration with index j and PUSCH power control adjustment state with index l, the UE shall determine the PUSCH transmission power $P_{PUSCH,f,c}(i,j,q_d,l)$ in PUSCH transmission period i as $$P_{PUSCH,f,c}(i, j, q_d, l) = \min \begin{cases} P_{CMAX,f,c}(i), \\ P_{O\_PUSCH,f,c}(j) + 10\log_{10}(2^\mu \cdot M_{RB,f,c}^{PUSCH}(i)) + \alpha_{f,c}(j) \cdot PL_{f,c}(q_d) + \\ \Delta_{TF,f,c}(i) + f_{f,c}(i, l) \end{cases}$$

[dBm]

where,
- $P_{CMAX,f,c}(i)$ is the configured UE transmit power defined in [8, TS 38.101] for carrier f of serving cell c in PUSCH transmission period i.
- $P_{O\_PUSCH,f,c}(j)$ is a parameter composed of the sum of a component $P_{O\_NOMINAL\_PUSCH,f,c}(j)$ and a component $P_{O\_UE\_PUSCH,f,c}(j)$ where $j \in \{0, 1, \ldots, J-1\}$.
  For j=0, $\alpha_{f,c}(j)=1$. For j=1, $\alpha_{f,c}(1)$ is provided by higher layer parameter p0alphasetindex in UL-TWG-Type1 or UL-TWG-Type2. For $j \in S_J$, a set of $\alpha_{f,c}(j)$ values are provided by a set of higher layer parameters p0-pusch-alpha-set in p0-push-alpha-setconfig and a respective index by higher layer parameter p0alphasetindex for carrier f of serving cell c where the size of the set is J–2 and is indicated by higher layer parameter num-p0-alpha-sets.
- $M_{RB,f,c}^{PUSCH}(i)$ is the bandwidth of the PUSCH resource assignment expressed in number of resource blocks for PUSCH transmission period i on carrier f of serving cell c and μ.
- $PL_{f,c}(q_d)$ is a downlink path-loss estimate in dB calculated by the UE using reference signal (RS) resource $q_d$ for carrier f of serving cell c, where the UE is configured with a number of RS resources by higher layer parameter num-pusch-pathlossReference-rs and a respective set of RS configurations for the number of RS resources is provided by higher layer parameter pusch-pathloss-Reference-rs that includes one or both of a set of SS/PBCH block indexes provided by higher layer parameter pusch-pathlossReference-SSB and a set of CSI-RS configuration indexes provided by higher layer parameter pusch-pathlossReference-CSIRS. The UE identifies a RS resource in the set of RS resources to correspond to a SS/PBCH block or to a CSI-RS configuration as provided by higher layer parameter pusch-pathlossreference-index in pusch-pathlossReference-rs-config.

If a UE transmits a PUCCH on carrier f in the primary cell c using PUCCH power control adjustment state with index l, the UE shall determine the PUCCH transmission power $P_{PUCCH,f,c}(i, q_u, q_d, l)$ in PUCCH transmission period i as $$P_{PUCCH,f,c}(i, q_u, q_d, l) = \min \begin{cases} P_{CMAX,f,c}(i), \\ P_{O\_PUCCH,f,c}(q_u) + PL_{f,c}(q_d) + \Delta_{F\_PUCCH}(F) + \Delta_{TF,f,c}(i) + g_{f,c}(i, l) \end{cases}$$

[dBm]

where
- $P_{CMAX,f,c}(i)$ is the configured UE transmit power for carrier f of serving cell c in PUCCH transmission period i.
- $P_{O\_PUCCH,f,c}(q_u)$ is a parameter composed of the sum of a component $P_{O\_NOMINAL\_PUCCH}$, provided by higher layer parameter P0-nominal-PUCCH for carrier f of primary cell c, and a component $P_{O\_UE\_PUCCCH}(q_u)$ provided by higher layer parameter P0-PUCCH, where $0 \leq q_u < Q_u$. $Q_u$ is a size for a set of $P_{O\_UE\_PUCCH}$ values provided by higher layer parameter num-p0-pucch. The set of $P_{O\_UE\_PUCCH}$ values is provided by higher layer parameter p0-pucch-set.
- $PL_{f,c}(q_d)$ is a downlink path-loss estimate in dB calculated by the UE for carrier f of the primary cell c using RS resource $q_d$, where $0 \leq q_d < Q_d$. $Q_d$ is a size for a set of RS resources provided by higher layer parameter num-pucch-pathlossReference-rs. The set of RS resources is provided by higher layer parameter pucch-pathlossReference-rs. The set of RS resources can include one or both of a set of SS/PBCH block indexes provided by higher layer parameter pucch-pathlossReference-SSB and a set of CSI-RS configuration indexes provided by higher layer parameter pucch-pathlossReference-CSIRS. The UE identifies a RS resource in the set of RS resources to correspond to a SS/PBCH block or to a CSI-RS configuration as provided by higher layer parameter pucch-pathlossreference-index.
- The parameter $\Delta_{F\_PUCCH}(F)$ is provided by higher layer parameter deltaF-pucch-f0 for PUCCH format 0, deltaF-pucch-f1 for PUCCH format 1, deltaF-pucch-f2 for PUCCH format 2, deltaF-pucch-f3 for PUCCH format 3, and deltaF-pucch-f4 for PUCCH format 4.
- $\Delta_{TF,f,c}(i)$ is a PUCCH transmission power adjustment component for carrier f of primary cell c In cases where SRS/SRI are absent, a configuration is needed in order to enable power control for beams In an illustrative embodiment, a plurality (e.g., 4) of PUSCH parameters is defined to be associated with SRI when the SRI present. These parameters may include P0 (referred to as $P_{O\_PUSCH,f,c}(j)$ above), Alpha (referred to as $\alpha_{f,c}(j)$ above), DL-pathloss-reference (referred to as $q_d$ above), and closed-loop index (referred to as 1 above). If default beam is based on PUCCH, PUCCH power-control is configured with corresponding parameters (except for Alpha). Furthermore, the PUCCH parameters should be configured within the PUCCH-SpatialRelationInfo IE. In some illustrative embodiments, parameters of PUCCH resource used to define PUCCH beam can be used, where, for example, Alpha may be hard-wired to 1, or alternately, Msg3-Alpha (which is used for power control of PUSCH carrying RACH msg3) may be reused. Such a configuration may advantageously work when SRS is absent and SRI is interpreted as index into list of PUCCH-SpatialRelationInfo IEs, as described above. In a multicarrier (i.e., carrier aggregation or dual connectivity) case, the PUCCH may refer to the PUCCH in the PUCCH-PCell or PUCCH-PSCell. In some examples, if the UE is provided by via SRI-PUSCH-PowerControl (with more than one values of a p0-PUSCH-AlphaSetId value) and if DCI format 0_1 includes a SRI field, the UE obtains a mapping from sri-PUSCH-PowerControlId in SRI-PUSCH-PowerControl between a set of values for the SRI field in DCI format 0_1 and a set of indexes provided by p0-PUSCH-AlphaSetId that map to a set of P0-PUSCH-AlphaSet values. If the PUSCH transmission is scheduled by a DCI format 0_1 that includes a SRI field, the UE determines the value of P0 from the p0-PUSCH-AlphaSetId value that is mapped to the SRI field value. Thus, in at least some examples, at least one power control parameter (e.g. p0) is derived from an identification value (e.g. p0-PUSCH-AlphaSetId) mapped to an SRI value (e.g. the SRI field value).

In another example, when SRS or SRI is absent, only some of the power control parameters may be based on the PUCCH-SpatialRelationInfo, for example, the DL-pathloss-reference, and others may be derived in other ways, for example, loop index may be fixed to l=0, or P0 may be derived assuming j=2, etc. This represents one example by which, if no SRS beam is available, the system may derive at least some power control parameters for the data channel communication from a separate RRC configuration or where at least some power control parameters for the data channel communication are set in accordance with a predetermined wireless protocol operating specification. When power control parameters values are set in accordance with a predetermined specification, this may be regarded as setting the values based on "hard-coded" features of the specification. The values l and j are examples of such hard-coded features. The value l is also referred to herein as a power control adjustment state loop index. The value j is also referred to herein as a parameter set configuration index. If a default beam is based on DL beams, the identified DL beam may also be the used as a pathloss-reference, or may be used conditional on other configurations determining if DL RSRP is being monitored for that beam. Alternately, a similar solution may be used as for PUCCH-based default beam, except that beam information may come from a different source (e.g., DL beam). As another alternative, separate RRC configuration pointing to power-control parameters may be used for cases in which SRS/SRI are absent. The default beam may be MAC-CE updatable in some illustrative embodiments, and/or may be used for a PUCCH-based default beam as well.

Default beams based on beams associated with an actual or virtual PUCCH resource may be updated by MAC-CE. Certain UEs may lack the capability to process these MAC-CE based updates, thus requiring RRC configuration to update the beam associated with the PUCCH resource. For UEs lacking this capability, the default beams may be based on beams of a DL channel such as PDCCH, which may be updated by MAC-CE. Alternatively, this scheme may be used for such UEs only if they also support capability for reciprocity or UL/DL beam correspondence, so that beams for downlink reception can also be meaningfully used for uplink transmission.

Referring now to FIG. 9, the power control equations for PUCCH and PUSCH provided above are shown in equations 902 and 904, respectively, to achieve power control for beams formed using techniques disclosed herein:

$$P_{PUCCH,f,c}(i,q_u,q_d,l)=P_{O\_PUCCH,f,c}(q_u)+PL_{f,c}(q_d)+\Delta_{F\_PUCCH}(F)+\Delta_{TF,f,c}(i)+g_{f,c}(i,1)$$

$$P_{PUSCH,f,c}(i,j,q_d,l)=P_{O\_PUSCH,f,c}(j)+\alpha_{f,c} \cdot PL_{f,c}(q_d)+\Delta_{TF,f,c}(i)+f_{f,c}(i,l)+10\log_{10}(2^{\mu} \cdot M_{RB,f,c}^{PUSCH}(i))$$

In some illustrative embodiments, the power control functions may be capped to $P_{CMAX,f,c}(i)$. A PUSCH power control module 906, which may be incorporated as part of operating environment 800, is also provided in the figure.

Figure 10:
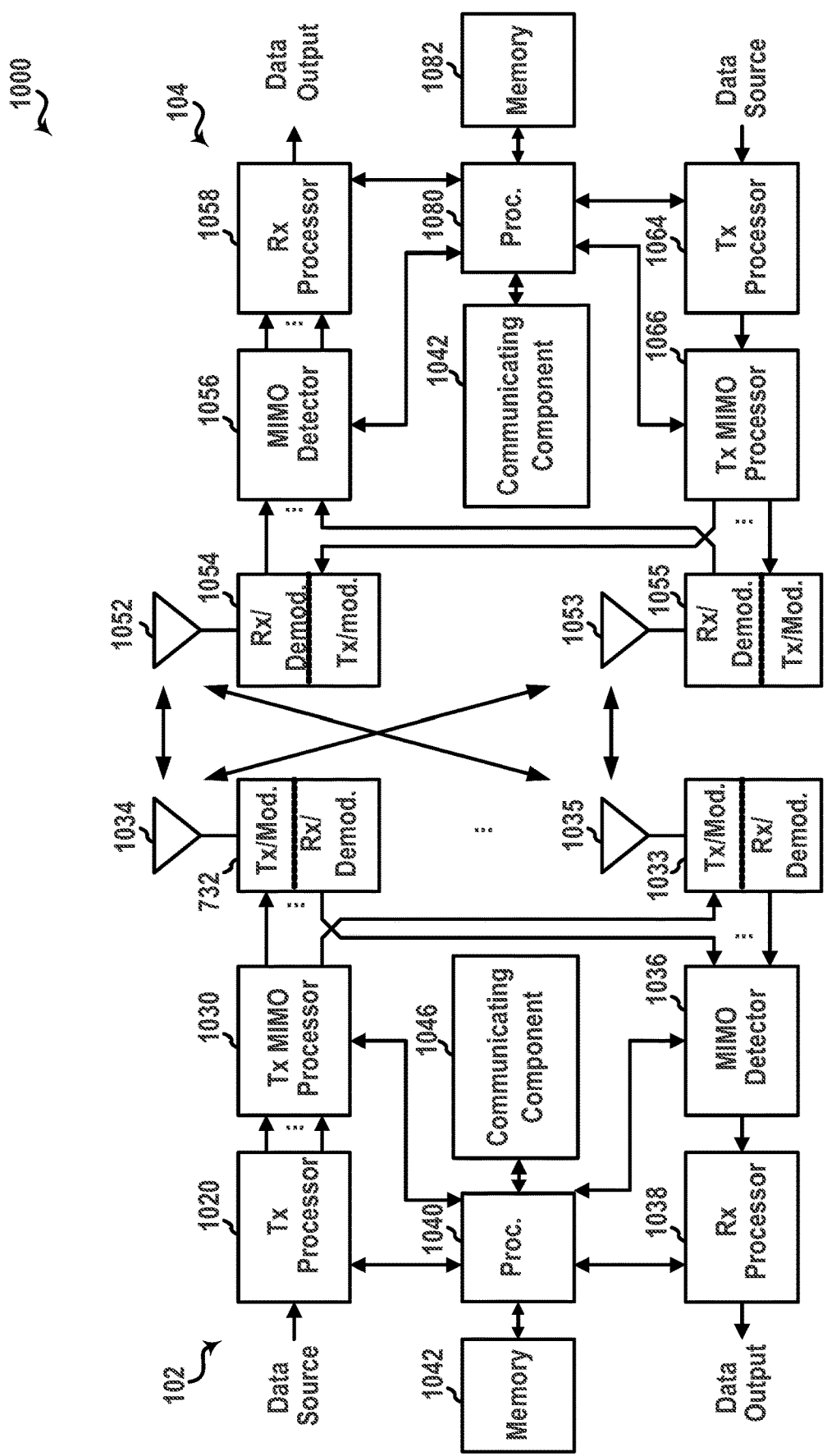
FIG. 10 is a block diagram illustrating an example of a multiple-input multiple-output (MIMO) communication system including a base station and a UE, in accordance with various aspects of the present disclosure.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1-2. At the UE 104, the UE antennas 1052 and 1053 may receive the DL signals from the base station 1002 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a communicating component 142 (see e.g., FIGS. 1 and 2).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a communicating component 146 (see e.g., FIGS. 1 and 3).

The components of the UE 1004 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1000.

Exemplary System-On-a-Chip Hardware Environment

Aspects of the systems and methods described herein can be exploited using a wide variety of mobile devices or other wireless user equipment (UE) devices and for a wide range of applications. To provide a concrete example, an exemplary SoC hardware environment will now be described wherein UE components are provided on a SoC processing circuit for use in a mobile communication device or other access terminal.

Figure 11:
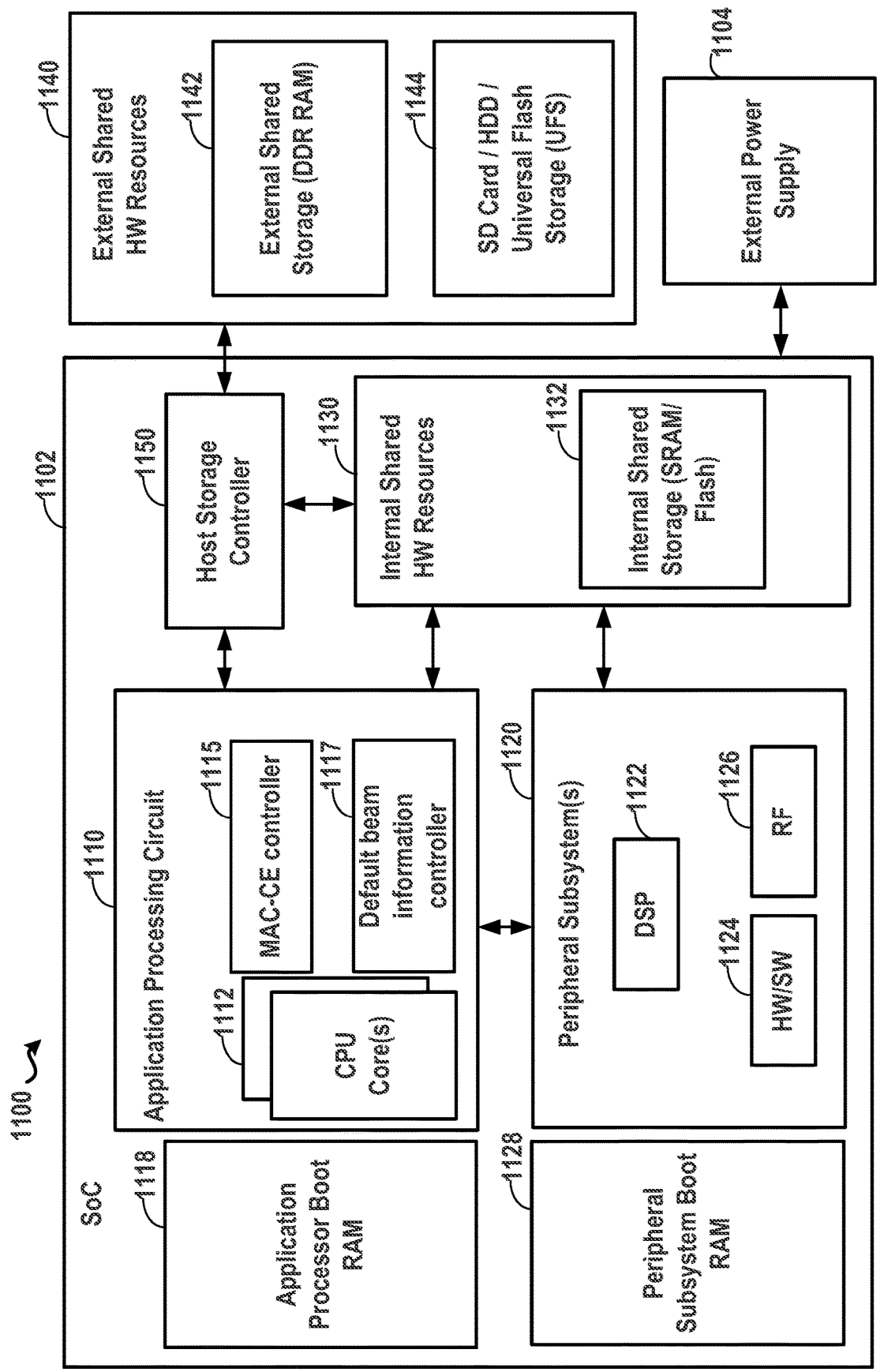
FIG. 11 illustrates an exemplary system-on-a-chip (SoC) for use in a UE.

FIG. 11 illustrates selected components of a UE or other mobile device 1100 having a SoC processing circuit 1102 configured in accordance with one example where various novel features may be exploited. The SoC processing circuit 1102 may be a modified version of a Snapdragon™ processing circuit of Qualcomm Incorporated. The SoC processing circuit 1102 receives power from an external power supply 1104 and includes an application processing circuit 1110, which includes a multi-core CPU 1112 and typically controls the operation of all components of the mobile communication device. Note that the external power supply is external to the SoC but is an internal component of the UE 1100 and may include, e.g., a rechargeable battery. In the example of FIG. 11, the application processing circuit 1110 is equipped to include (or operate in conjunction with) a MAC-CE controller 1115 and a default beam information controller 1117. The MAC-CE controller 1115 may be configured or equipped to perform or control the various operation discussed herein where the MAC-CE is used to update the SRS beam. The default beam information controller 1117 may be configured or equipped to perform or control the various operation discussed herein where default beam information is used, particularly if SRS and/or SRI are absent.

In the example of FIG. 11, the application processing circuit 1110 is also coupled to a host storage controller 1150 for controlling storage of data in the internal shared storage device 1132 that forms part of internal shared hardware (HW) resources 1130. The application processing circuit 1110 may also include a boot RAM or ROM 1118 that stores boot sequence instructions for the various components of the SoC processing circuit 1102. The SoC processing circuit 1102 further includes one or more peripheral subsystems 1120 controlled by application processing circuit 1110. The peripheral subsystems 1120 may include but are not limited to a storage subsystem (e.g., read-only memory (ROM), random access memory (RAM)), a video/graphics subsystem (e.g., digital signal processing circuit (DSP), graphics processing circuit unit (GPU)), an audio subsystem (e.g., DSP, analog-to-digital converter (ADC), digital-to-analog converter (DAC)), a power management subsystem, security subsystem (e.g., encryption components and digital rights management (DRM) components), an input/output (I/O) subsystem (e.g., keyboard, touchscreen) and wired and wireless connectivity subsystems (e.g., universal serial bus (USB), Global Positioning System (GPS), Wi-Fi, Global System Mobile (GSM), Code Division Multiple Access (CDMA), 4G Long Term Evolution (LTE) modems). The exemplary peripheral subsystem 1120, which is a modem subsystem, includes a DSP 1122, various other hardware (HW) and software (SW) components 1124, and various radio-frequency (RF) components 1126. In one aspect, each peripheral subsystem 1120 also includes a boot RAM or ROM 1128 that stores a primary boot image (not shown) of the associated peripheral subsystems 1120. As noted, the SoC processing circuit 1102 further includes various internal shared HW resources 1130, such as an internal shared storage 1132 (e.g. static RAM (SRAM), flash memory, etc.), which is shared by the application processing circuit 1110 and the various peripheral subsystems 1120 to store various runtime data or other parameters and to provide host memory and which may store various keys or passwords for secure processing.

In one aspect, the components 1110, 1112, 1115, 1117, 1118, 1119, 1120, 1128, 1130 and 1150 of the SoC 1102 are integrated on a single-chip substrate. The SoC processing circuit 1102 further includes various external shared HW resources 1140, which may be located on a different chip substrate and may communicate with the SoC processing circuit 1102 via one or more buses. External shared HW resources 1140 may include, for example, an external shared storage 1142 (e.g. double-data rate (DDR) dynamic RAM) and/or permanent or semi-permanent data storage 1144 (e.g., a secure digital (SD) card, hard disk drive (HDD), an embedded multimedia card, a universal flash device (UFS), etc.), which may be shared by the application processing circuit 1110 and the various peripheral subsystems 1120 to store various types of data, such as an operating system (OS) information, system files, programs, applications, user data, audio/video files, etc. When the UE incorporating the SoC processing circuit 1102 is activated, the SoC processing circuit begins a system boot up process in which the application processing circuit 1110 may access boot RAM or ROM 1118 to retrieve boot instructions for the SoC processing circuit 1102, including boot sequence instructions for the various peripheral subsystems 1120. The peripheral subsystems 1120 may also have additional peripheral boot RAM or ROM 1128.

Exemplary Systems and Methods

Figure 12:
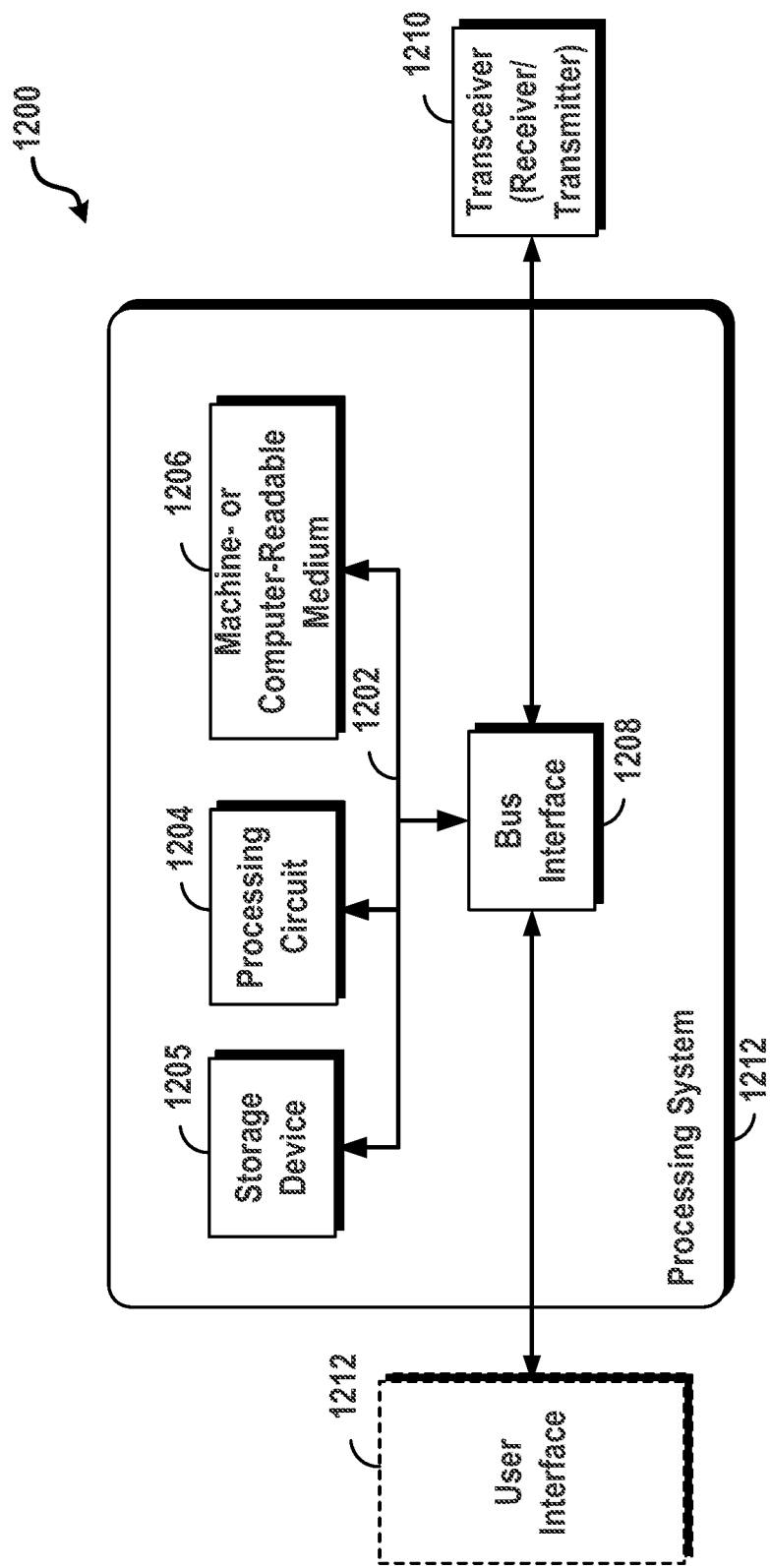
FIG. 12 is a block diagram illustrating an example of a hardware implementation for an apparatus employing a processing system that may exploit the systems, methods and apparatus of FIGS. 1-11.

FIG. 12 illustrates an overall system or apparatus 1200 in which the systems, methods and apparatus of FIGS. 1-11 (or aspects thereof) may be implemented. In accordance with various aspects of the disclosure, an element, or any portion of an element, or any combination of elements may be implemented with a processing system 1214 that includes one or more processing circuits 1204 such as the SoC processing circuit of FIG. 10. For example, apparatus 1200 may be a UE of a mobile communication system. Apparatus 1200 may be used with a radio network controller (RNC). In addition to an SoC, examples of processing circuits 1204 include microprocessing circuits, microcontrollers, DSPs, field programmable gate arrays (FPGAs), programmable logic devices (PLDs), state machines, gated logic, discrete hardware circuits, and other suitable hardware configured to perform the various functionality described throughout this disclosure. That is, the processing circuit 1204, as utilized in the apparatus 1200, may be used to implement any one or more of the processes described above and illustrated in FIGS. 1, 2, 3 4, 5, 6, 7, 8, 9, 10, and 11 (and those illustrated in FIGS. 13, 14, 15, 16, 17, 18, 19, 20, 21, 22, 23, and 24 discussed below).

In the example of FIG. 12, the processing system 1214 is implemented with a bus architecture, represented generally by the bus 1202. The bus 1202 may include any number of interconnecting buses and bridges depending on the specific application of the processing system 1214 and the overall design constraints. The bus 1202 links various circuits including one or more processing circuits (represented generally by the processing circuit 1204), the storage device 1205, and a machine-readable, processor-readable, processing circuit-readable or computer-readable media (represented generally by a non-transitory machine-readable medium 1206) The bus 1202 may also link various other circuits such as timing sources, peripherals, voltage regulators, and power management circuits, which are well known in the art, and therefore, will not be described any further. The bus interface 1208 provides an interface between bus 1202 and a transceiver 1210, i.e. a receiver/transmitter. The transceiver 1210 provides a means for communicating with various other apparatus over a transmission medium. Depending upon the nature of the apparatus, a user interface 1212 (e.g., keypad, display, speaker, microphone, joystick) may also be provided.

The processing circuit 1204 is responsible for managing the bus 1202 and for general processing, including the execution of software stored on the machine-readable medium 1206. The software, when executed by processing circuit 1204, causes processing system 1214 to perform the various functions described herein for any particular apparatus. Machine-readable medium 1206 may also be used for storing data that is manipulated by processing circuit 1204 when executing software.

One or more processing circuits 1204 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1206. The machine-readable medium 1206 may be a non-transitory machine-readable medium or computer-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer.

Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data.

Hence, in one aspect of the disclosure, processing circuit 1204 illustrated in FIG. 12 may be a specialized processing circuit (e.g., an application specific integrated circuit (ASIC)) that is specifically designed and/or hard-wired to perform the algorithms, methods, and/or blocks described in FIGS. 1, 2, 3 4, 5, 6, 7, 8, 9, 10, and 11 (and those illustrated in FIGS. 13, 14, 15, 16, 17, 18, 19, 20, 21, 22, 23, and 24, discussed below). Thus, such a specialized processing circuit (e.g., ASIC) may be one example of a means for executing the algorithms, methods, and/or blocks described in FIGS. 1, 2, 3 4, 5, 6, 7, 8, 9, 10, and 11 (and those illustrated in FIGS. 13, 14, 15, 16, 17, 18, 19, 20, 21, 22, 23, and 24, discussed below). The machine-readable storage medium may store instructions which when executed by a specialized processing circuit (e.g., ASIC) causes the specialized processing circuit to perform the algorithms, methods, and/or blocks described herein.

The machine-readable medium 1206 may reside in the processing system 1214, external to the processing system 1214, or distributed across multiple entities including the processing system 1214. The machine-readable medium 1206 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 1206 may have one or more instructions which when executed by the processing circuit 1204 (formed, e.g., on an IC die) causes the processing circuit to: determine, at a UE, whether or not a SRS beam has been configured for use with a data channel communication; configure, upon determining that the SRS beam has been configured, a MAC-CE to update the SRS beam; update the SRS beam using the MAC-CE; and transmit the data channel communication based, at least in part, on the SRS updated using the MAC-CE, using techniques already described.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a DSP, an ASIC, FPGA or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Figure 13:
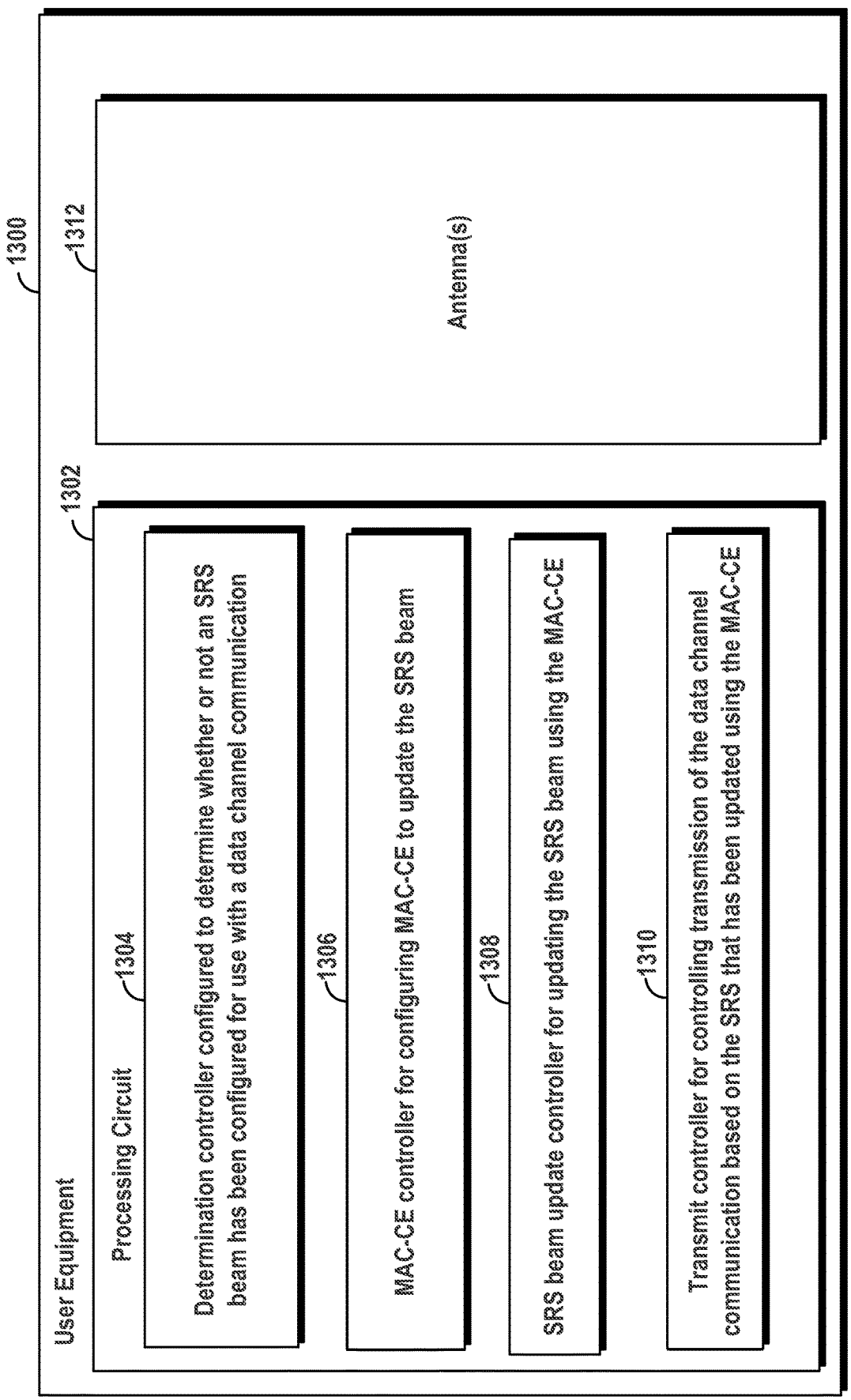
FIG. 13 is a block diagram illustrating exemplary components of a computing and/or processing system equipped with components for configuring MAC-CE to update a SRS beam.

FIG. 13 illustrates selected and exemplary components of a UE 1300 (or other wireless communication device) having a processing circuit 1302 with various components equipped to implement or perform the MAC-CE-based operations discussed above. In particular, a determination controller 1304 is configured to determine whether or not an SRS beam has been configured for use with a data channel communication. A MAC-CE controller 1306 is provided for configuring MAC-CE to update the SRS beam. An SRS beam update controller 1308 is provided for updating the SRS beam using the MAC-CE. A transmit controller 1310 is provided for controlling transmission of the data channel communication based on the SRS updated using the MAC-CE. The UE 1400 also includes one or more antennas 1312 for use in transmission and reception.

Figure 14:
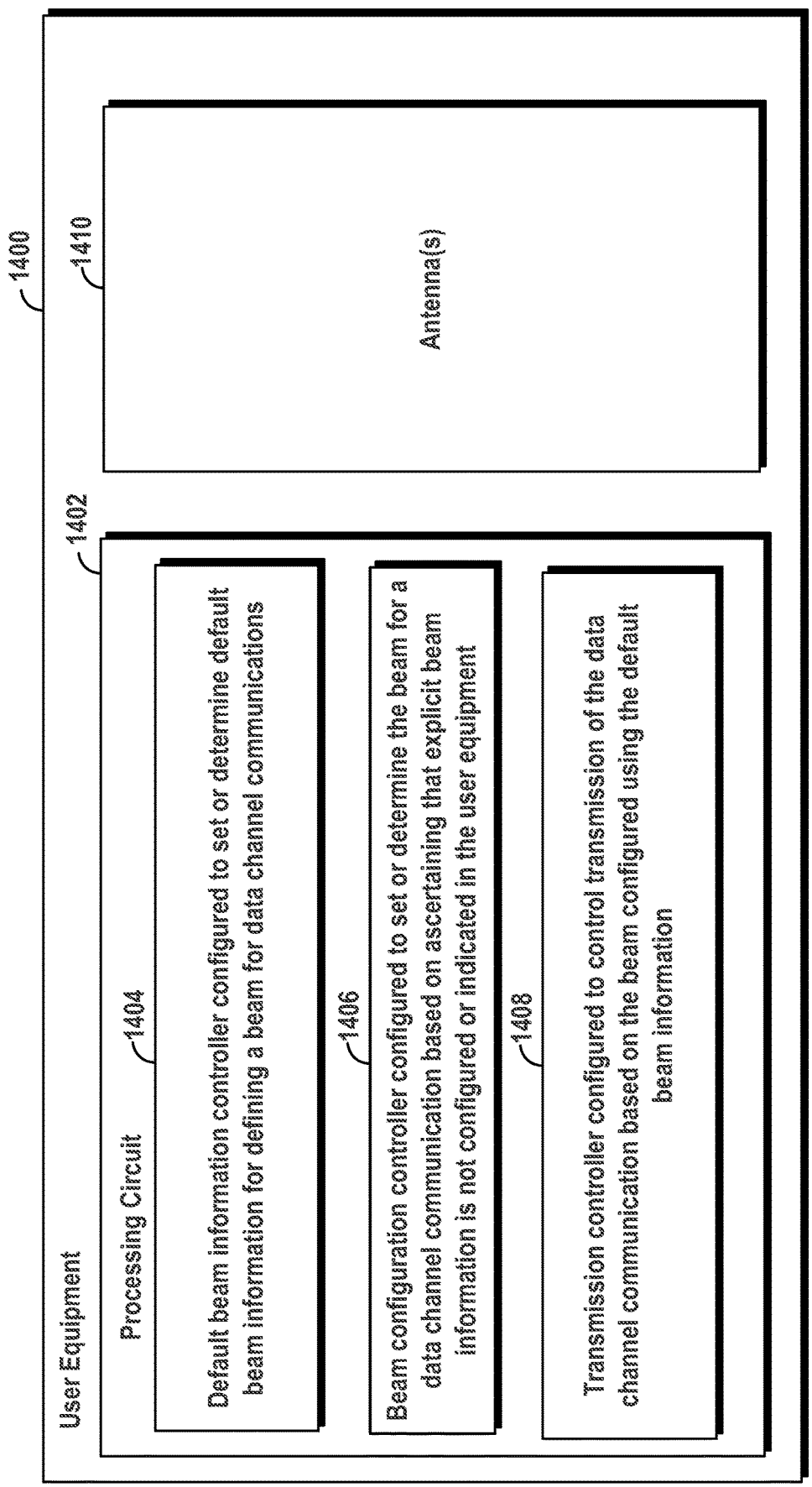
FIG. 14 is a block diagram illustrating exemplary components of a computing and/or processing system equipped with components for exploiting default beam information.

FIG. 14 illustrates selected and exemplary components of another UE 1400 (or other wireless communication device) having a processing circuit 1402 with various components equipped to implement or perform the default beam information-based operations discussed above. In particular, a default beam information controller 1404 is configured to set or determine default beam information for defining a beam for data channel communications. A beam configuration controller 1406 is configured to set or determine the beam for a data channel communication based on ascertaining that explicit beam information is not configured or indicated in the user equipment. A transmission controller 1408 is configured to control transmission of the data channel communication based on the beam configured using the default beam information. The UE 1400 also includes one or more antennas 1410 for use in transmission and reception.

Figure 15:
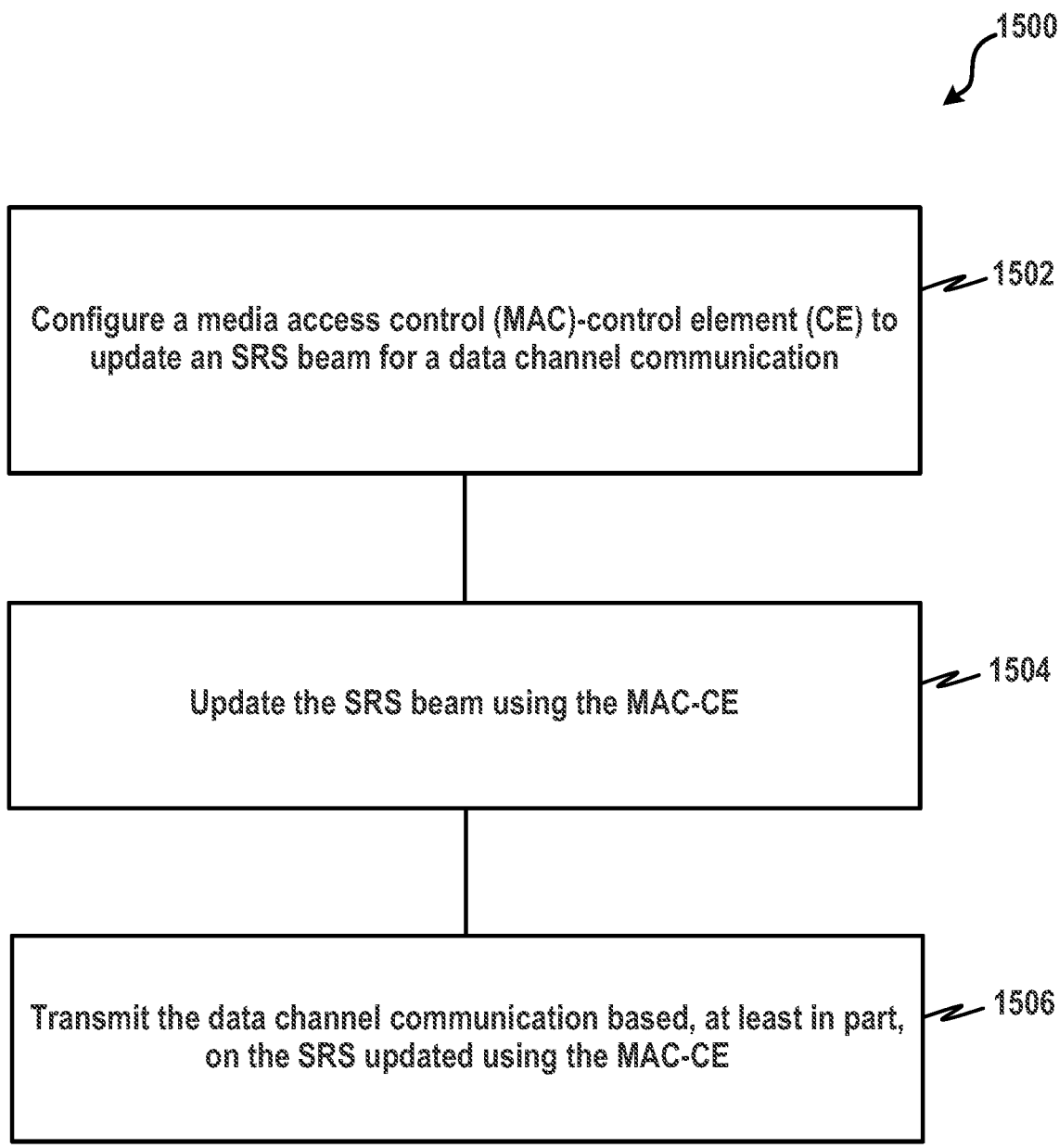
FIG. 15 summarizes exemplary procedures for configuring MAC-CE to update an SRS beam.

FIG. 15 broadly illustrates and summarizes methods or procedures 1500 that may be performed by suitably equipped devices or components, such as UE 1300, discussed above. Briefly, at 1502, UE configures a MAC-CE to update an SRS beam. At 1504, the UE updates the SRS beam using the MAC-CE. At 1506, the UE updates the SRS beam using the MAC-CE. At 1508, the UE transmits the data channel communication based, at least in part, on the SRS updated using the MAC-CE.

In some examples, the functions discussed in connection with FIG. 15 may be implemented by a suitable device or apparatus, such as: means for configuring a MAC-CE to update the SRS beam; means for updating the SRS beam using the MAC-CE; and means for transmitting the data channel communication based, at least in part, on the SRS updated using the MAC-CE.

Figure 16:
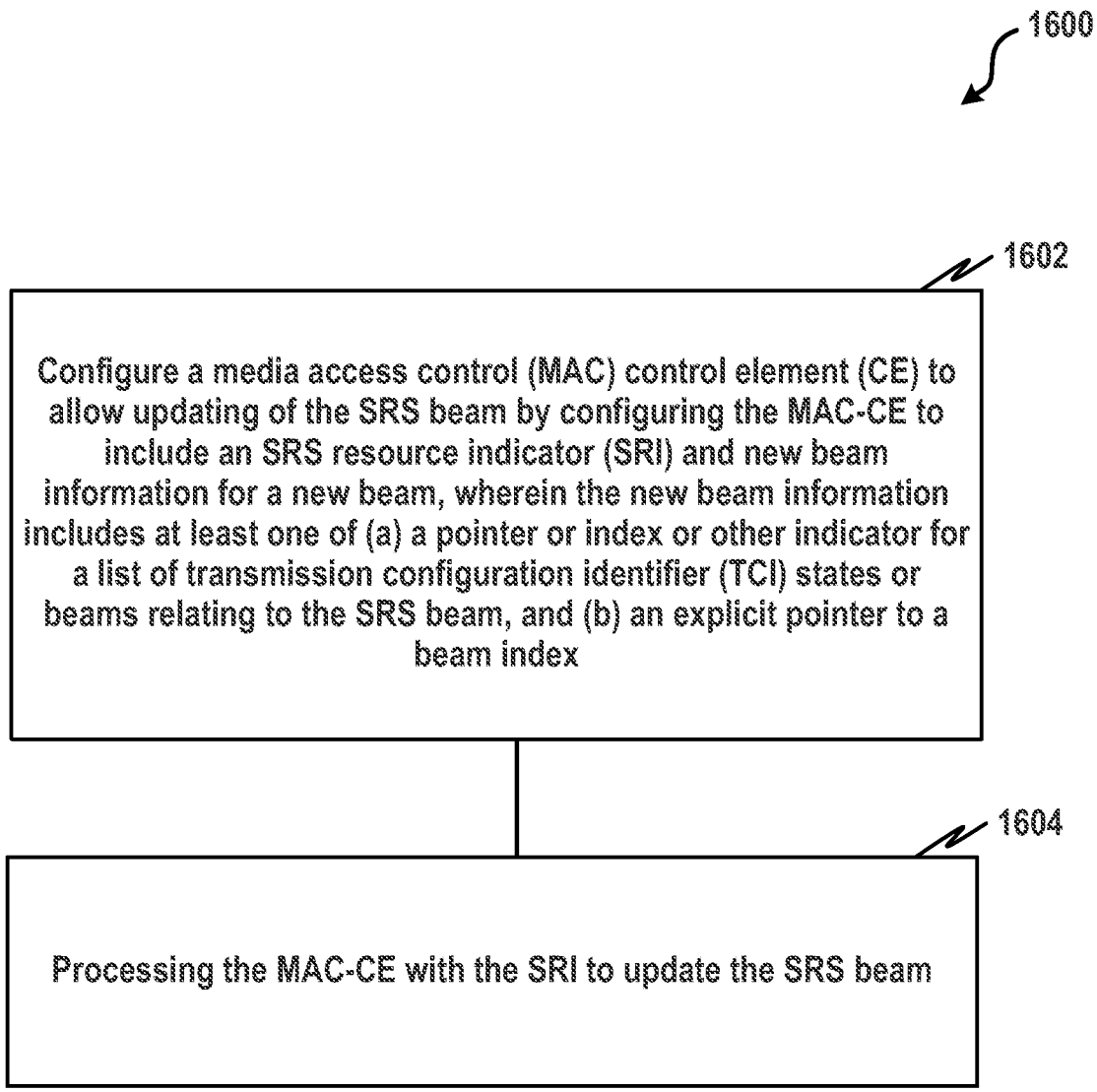
FIG. 16 further illustrates exemplary procedures for configuring MAC-CE to update an SRS beam.

FIG. 16 illustrates and summarizes additional methods or procedures 1600 that may be performed by suitably equipped devices or components, such as UE 1300. Briefly, at 1602, the UE configures the MAC-CE to allow updating of the SRS beam by configuring the MAC-CE to include an SRI and new beam information for a new beam, wherein the new beam information includes at least one of (a) a pointer or index or other indicator for a list of TCI states or beams relating to the SRS beam, and (b) an explicit pointer to a beam index. At 1604, the UE processes the MAC-CE with the SRI to update the SRS beam.

Figure 17:
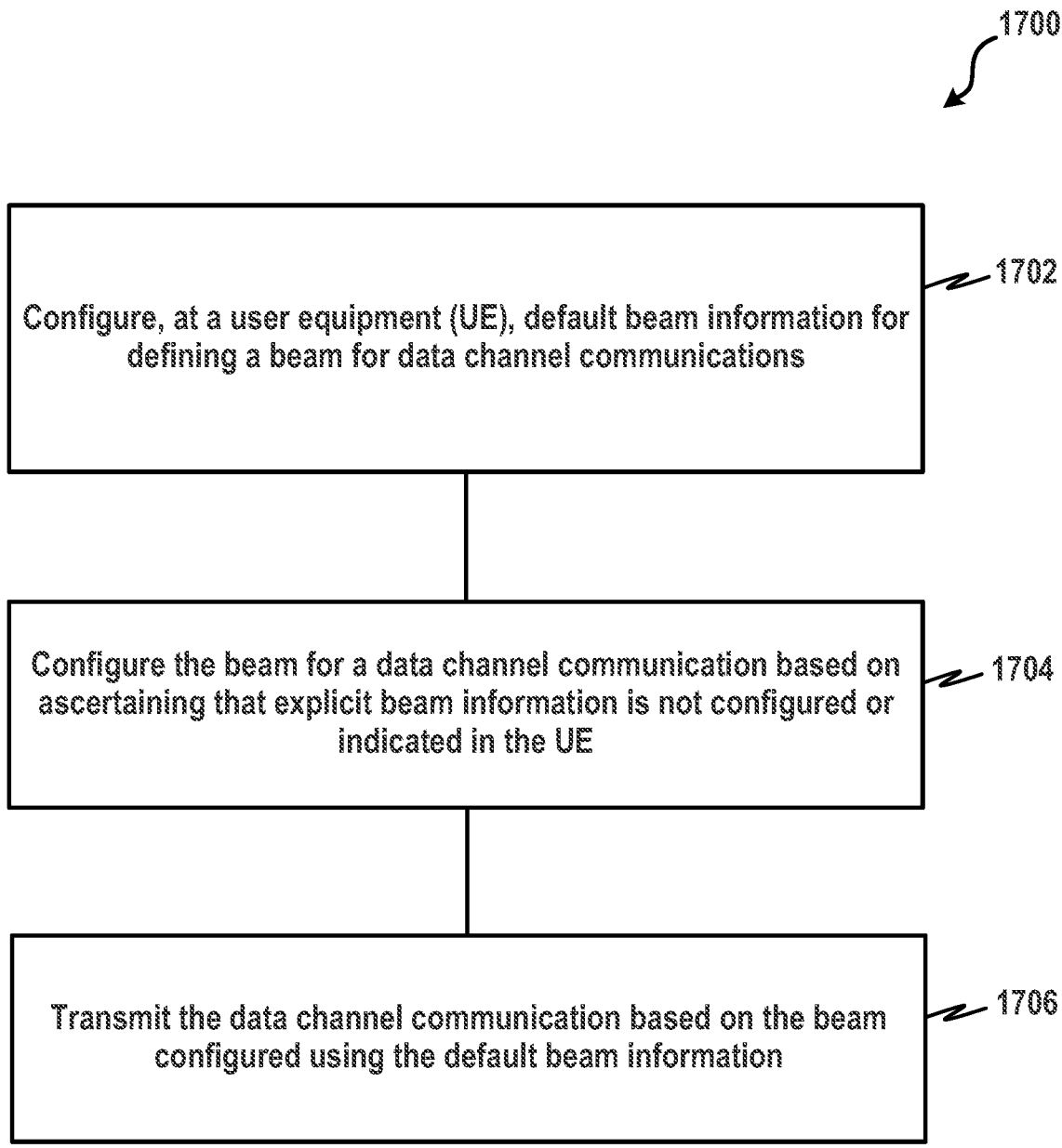
FIG. 17 summarizes exemplary procedures for exploiting default beam information.

FIG. 17 broadly illustrates and summarizes methods or procedures 1700 that may be performed by suitably equipped devices or components, such as UE 1400, discussed above. Briefly, at 1702, the UE configures default beam information for defining a beam for data channel communications. At 1704, the UE configures the beam for a data channel communication based on ascertaining that explicit beam information is not configured or indicated in the UE. At 1706, the UE transmits the data channel communication based on the beam configured using the default beam information.

In some examples, the functions discussed in connection with FIG. 17 may be implemented by a suitable device or apparatus, such as: a means for configuring default beam information for defining a beam for data channel communications; means for configuring the beam for a data channel communication based on ascertaining that explicit beam information is not configured or indicated in the UE; and means for transmitting the data channel communication based on the beam configured using the default beam information.

In some examples, the functions discussed in connection with FIG. 17 may be set forth within a non-transitory processor-readable medium that includes instructions, which when executed by a processor, that cause the processor to: configure a MAC-CE to update an SRS beam; update the SRS beam using the MAC-CE; and control the transmission of the data channel communication based, at least in part, on the SRS updated using the MAC-CE.

Figure 18:
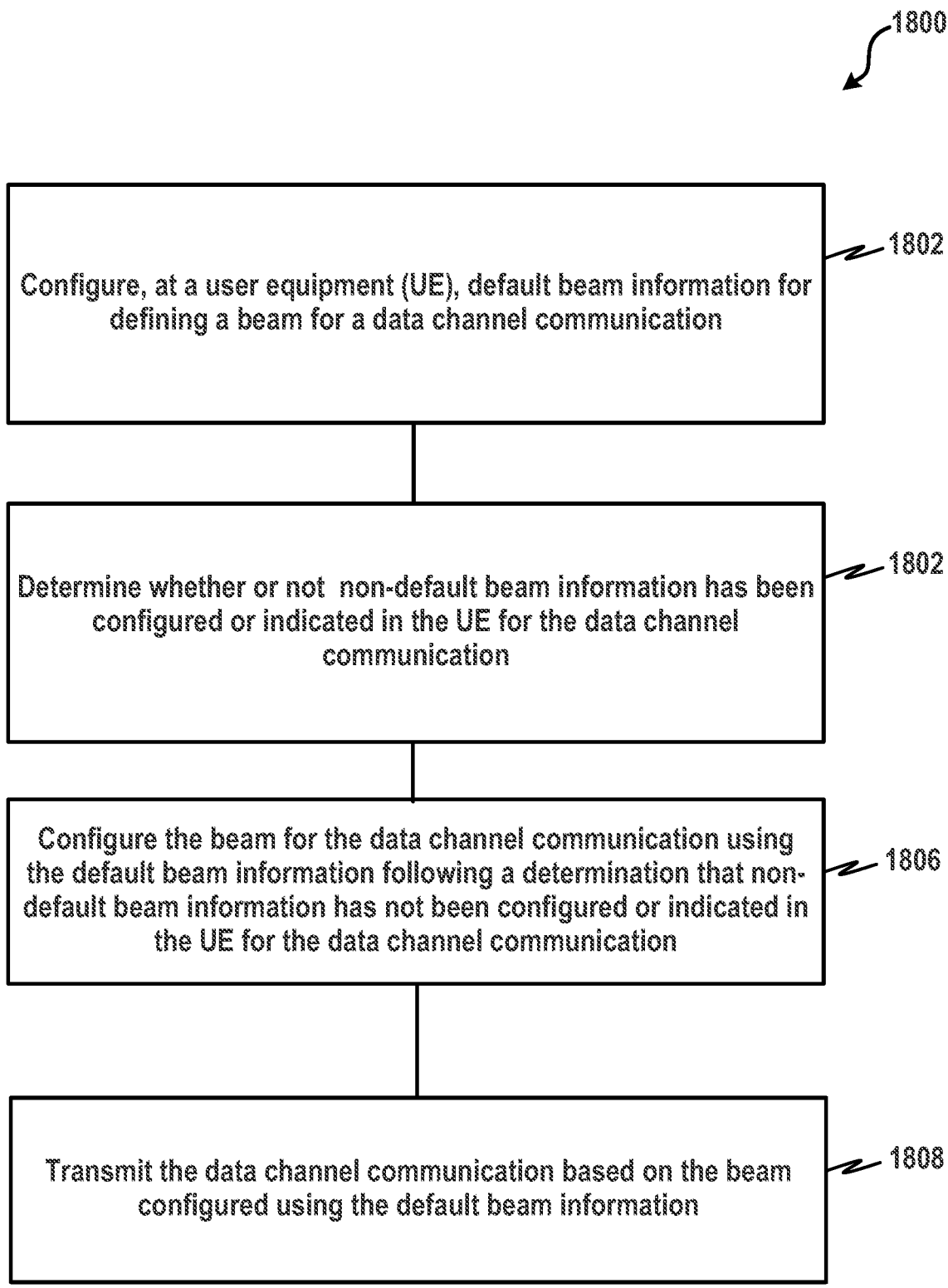
FIG. 18 further illustrates exemplary procedures for exploiting default beam information.

FIG. 18 broadly illustrates and summarizes methods or other procedures 1800 that may be performed by suitably equipped devices or components, such as UE 1400, discussed above. Briefly, at 1802, the UE configures default beam information for defining a beam for data channel communications. At 1804, the UE determines whether or not non-default (e.g. explicit) beam information has been configured or indicated in the UE for the data channel communication. At 1806, the UE configures the beam for the data channel communication using the default beam information following a determination that non-default beam information has not been configured or indicated in the UE for the data channel communication. At 1808, the UE transmits the data channel communication based on the beam configured using the default beam information.

In some examples, the functions discussed in connection with FIG. 18 may be implemented by a suitable device or apparatus, such as: a means for configuring default beam information for defining a beam for data channel communications; means for determining whether or not non-default (e.g. explicit) beam information has been configured or indicated in the UE for the data channel communication; means for configuring the beam for the data channel communication using the default beam information following a determination that non-default beam information has not been configured or indicated in the UE for the data channel communication; and means for transmitting the data channel communication based on the beam configured using the default beam information.

Figure 19:
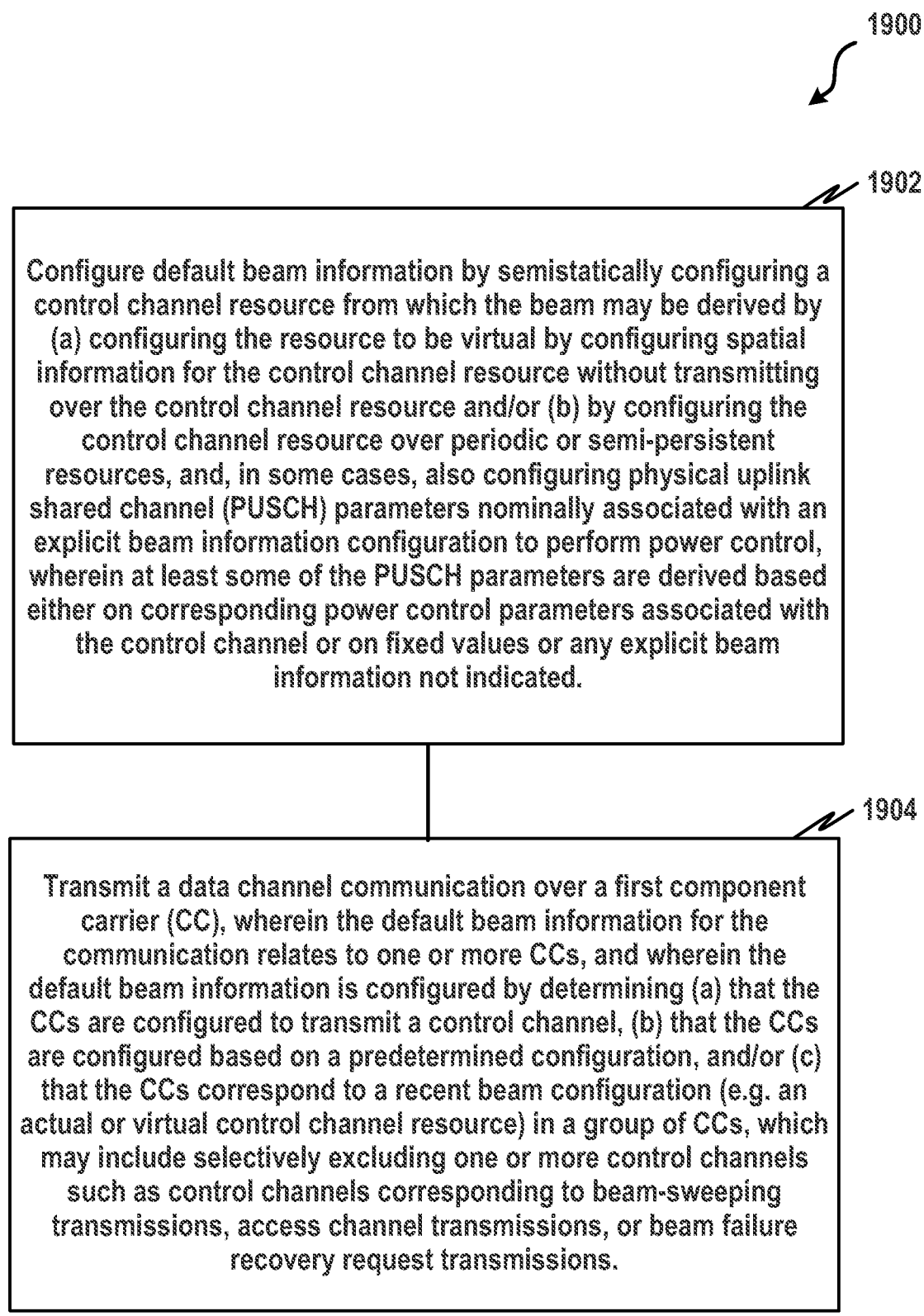
FIG. 19 further illustrates still more exemplary procedures for exploiting default beam information.

FIG. 19 illustrates and summarizes additional methods or procedures 1900 that may be performed by suitably equipped devices or components, such as UE 1400. Briefly, at 1902, the UE configures default beam information by semistatically configuring a control channel resource from which the beam may be derived by (a) configuring the resource to be virtual by configuring spatial information for the control channel resource without transmitting over the control channel resource and/or (b) by configuring the control channel resource over periodic or semi-persistent resources, and, in some cases, also configuring physical uplink shared channel (PUSCH) parameters nominally associated with an explicit beam information configuration to perform power control, wherein at least some of the PUSCH parameters are derived based either on corresponding power control parameters associated with the control channel or on fixed values or any explicit beam information not indicated. At 1904, the UE transmits a data channel communication over a first component carrier (CC), wherein the default beam information for the communication relates to one or more CCs, and wherein the default beam information is configured by determining (a) that the CCs are configured to transmit a control channel, (b) that the CCs are configured based on a predetermined configuration, and/or (c) that the CCs correspond to a recent (prior) beam configuration (e.g. an actual or virtual control channel resource) in a group of CCs, which may include selectively excluding one or more control channels such as control channels corresponding to beam-sweeping transmissions, access channel transmissions, or beam failure recovery request transmissions.

Figure 20:
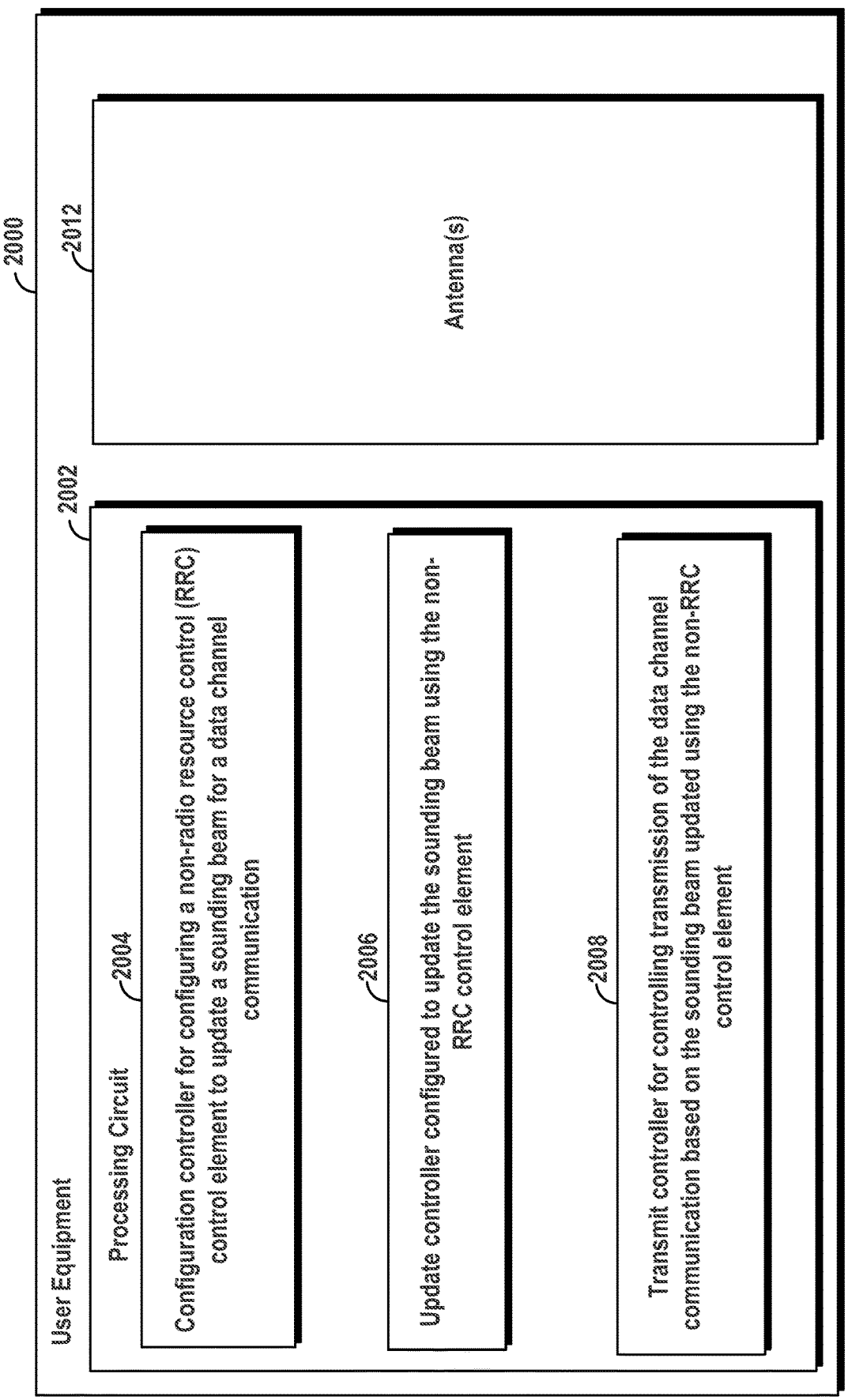
FIG. 20 is a block diagram illustrating exemplary components of a computing and/or processing system equipped with components for configuring a non-RRC control element to update a sounding beam for a data channel communication.

FIG. 20 illustrates selected and exemplary components of a UE 2000 (or other wireless communication device) having a processing circuit 2002 with various components equipped to implement or perform at least some of the operations discussed above. In particular, a controller 2004 is provided for configuring a non-RRC control element (such as a MAC-CE element) to update a sounding beam (such as an SRS beam) for a data channel communication. An update controller 2006 is configured to update the sounding beam using the non-RRC control element. A transmit controller 2008 is configured for controlling the transmission of the data channel communication based, at least in part, on the sounding beam updated using the non-RRC control element. The UE 200 also includes one or more antennas 2012 for use in transmission and reception.

Figure 21:
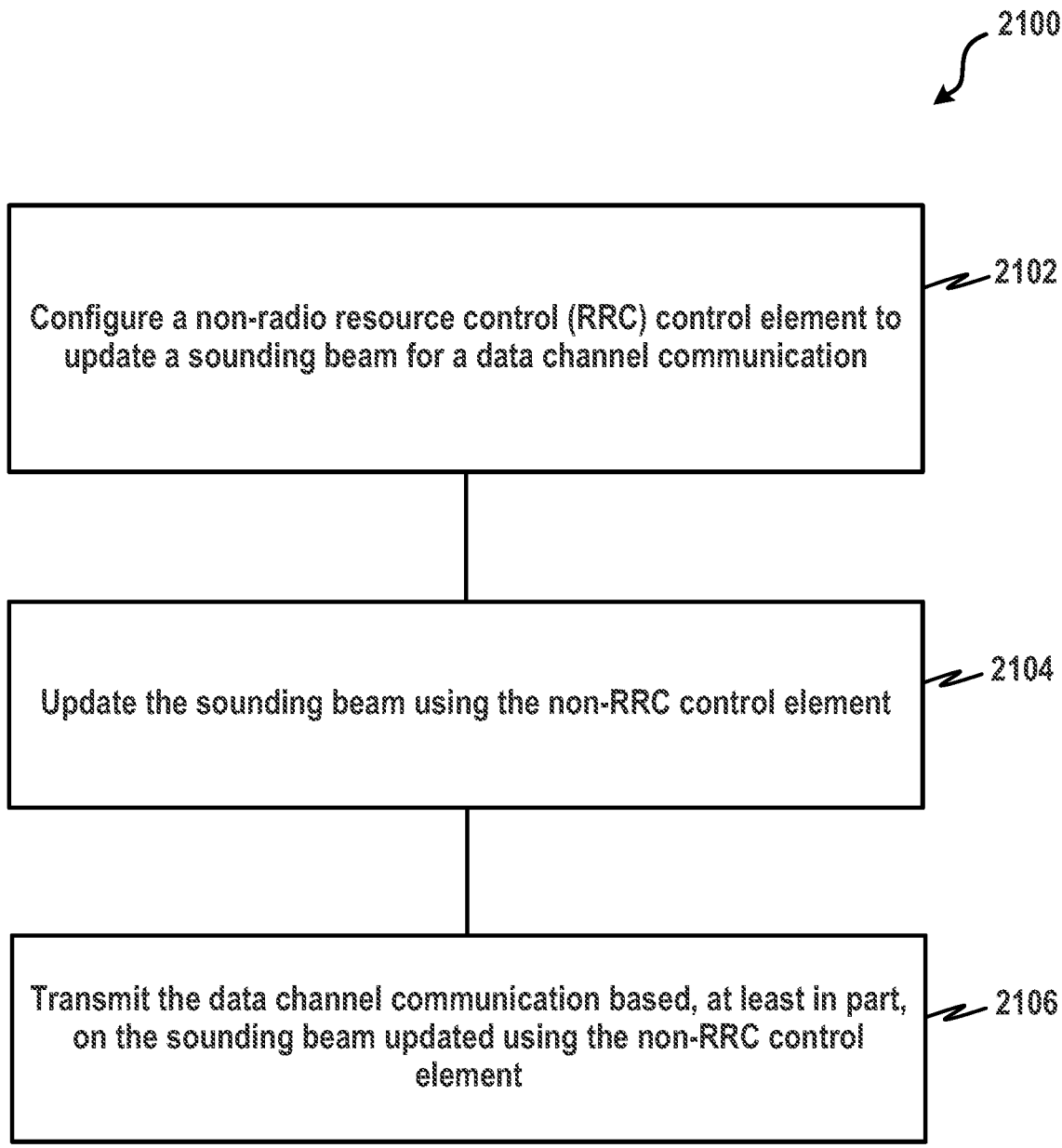
FIG. 21 summarizes exemplary procedures for configuring a non-RRC control element to update a sounding beam for a data channel communication.

FIG. 21 broadly illustrates and summarizes methods or procedures 2100 that may be performed by suitably equipped devices or components, such as UE 1300, discussed above. Briefly, at 2102, the device configures a non-RRC control element to update a sounding beam for a data channel communication. At 2104, the device updates the sounding beam using the non-RRC control element. At 2106, the device transmits the data channel communication based, at least in part, on the sounding beam updated using the non-RRC control element. In some examples, the non-RRC control element is a MAC-CE and the sounding beam is an SRS beam. In some aspects, the functions discussed in connection with FIG. 21 may be implemented by a suitable device or apparatus, such as: means for configuring a non-RRC control element to update a sounding beam for a data channel communication; means for updating the sounding beam using the non-RRC control element; and means for transmitting the data channel communication based, at least in part, on the sounding beam updated using the non-RRC control element. In some aspects, the functions discussed in connection with FIG. 21 may be set forth within a non-transitory processor-readable medium that includes instructions, which when executed by a processor, that cause the processor to: configure a non-RRC control element to update a sounding beam for a data channel communication; update the sounding beam using the non-RRC control element; and transmit the data channel communication based, at least in part, on the sounding beam updated using the non-RRC control element.

Further Information Regarding MAC Layers and MAC-CE

Figure 22:
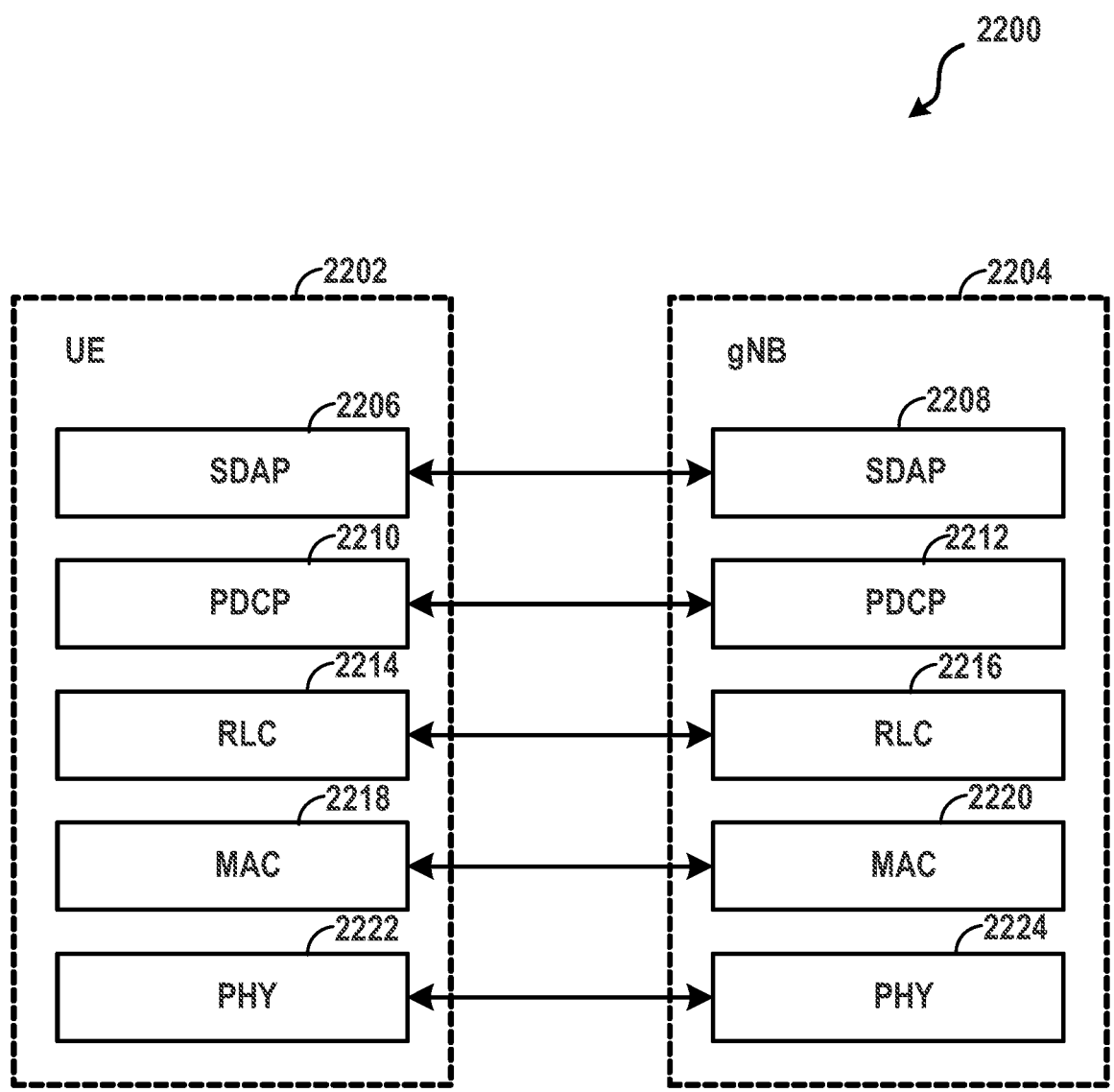
FIG. 22 illustrates a user plane protocol stack having a MAC sublayer.

FIG. 22 illustrates a user plane protocol stack 2200 having a MAC sublayer within a UE 2202 and a gNB 2204. The components shown in the figure include: a Service Data Adaptation Protocol (SDAP) layer 2206 in the UE and a corresponding SDAP layer 2208 in the gNB; a Packet Data Convergence Protocol (PDCP) layer 2210 in the UE and a corresponding PDCP layer 2210 in the gNB; a radio link control (RLC) layer 2214 in the UE and a corresponding RLC layer 2216 in the gNB; a MAC layer 2218 in the UE and a corresponding MAC layer 2220 in the gNB; and a physical (PHY) layer 2222 in the UE and a corresponding PHY layer 2224 in the gNB.

Figure 23:
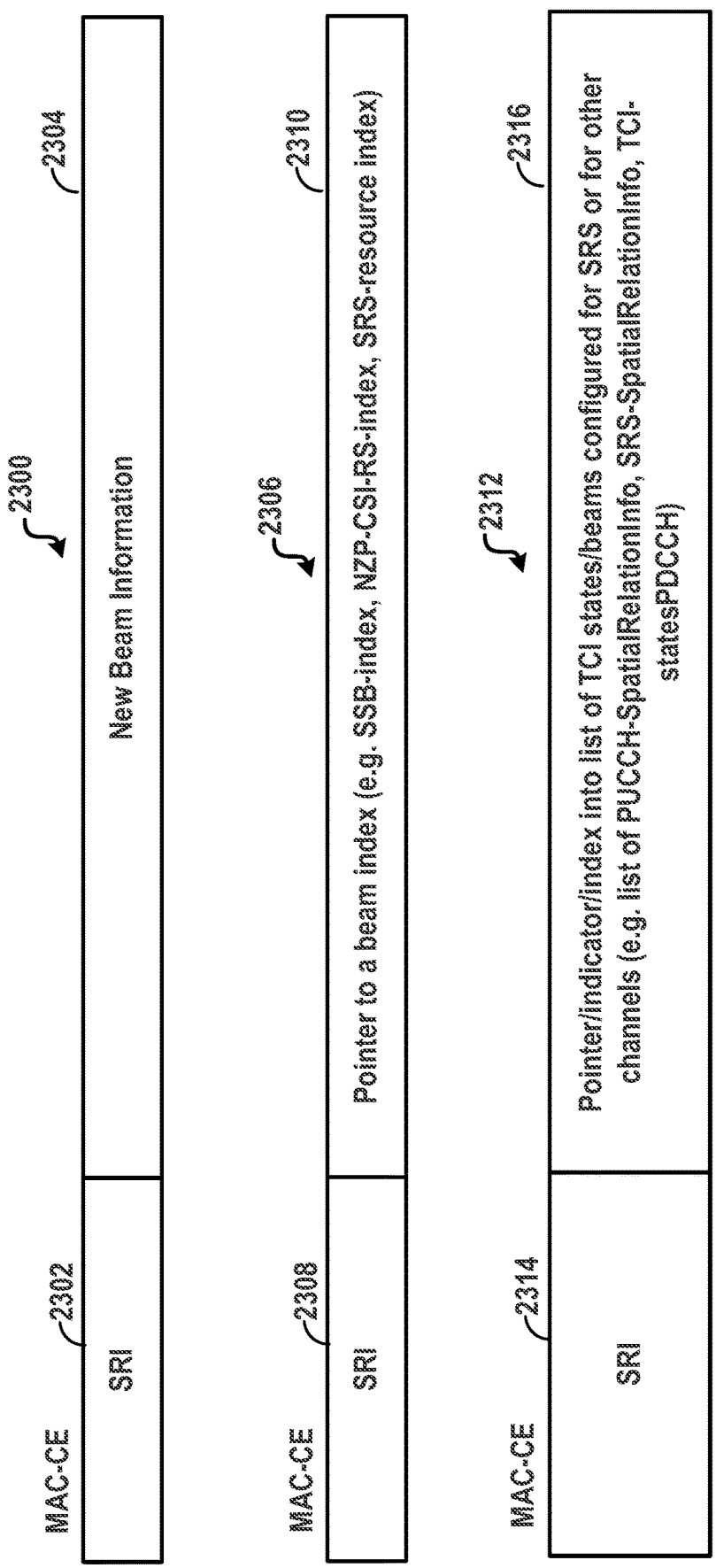
FIG. 23 illustrates exemplary MAC-CEs.

FIG. 23 illustrates exemplary MAC CEs that may be generated by the MAC layer of the UE of FIG. 22. In a first example, a MAC CE 2300 includes an SRI 2302 and new beam information 2304, which may, in general, be provided in any suitable form. In a second example, a MAC CE 2306 includes an SRI 2308 and new beam information 2310 in the form of a pointer to a beam index, such as SSB-index, NZP-CSI-RS-index, SRS-resource index. In a third example, a MAC CE 2312 includes an SRI 2314 and new beam information 2316 in the form of a pointer/indicator/index into list of TCI states/beams configured for SRS or for other channels, such as a list of PUCCH-SpatialRelation-Info, SRS-SpatialRelationInfo, TCI-statesPDCCH. As noted above in connection with FIG. 6, these indicator elements could in turn point to SSB-index, NZP-CSI-RS-index, SRS-Resource-index, etc. See, also, FIGS. 8A, 8B, and 8B, discussed above, for further details.

Additional Exemplary Systems and Methods

Figure 24:
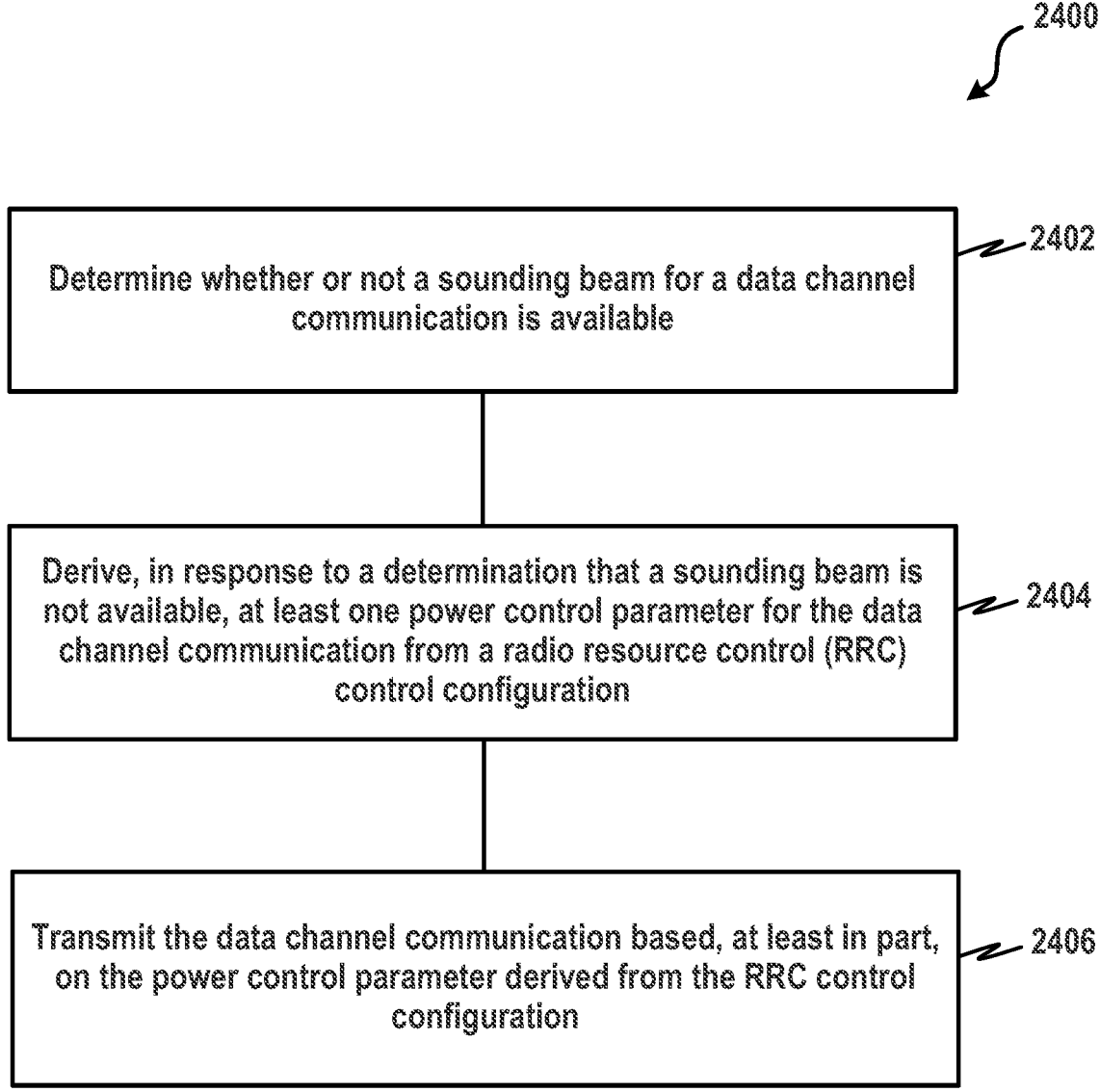
FIG. 24 summarizes exemplary procedures deriving power control parameters for a data channel communication from in the absence of a sounding beam.

FIG. 24 broadly illustrates and summarizes methods or procedures 2400 that may be performed by suitably equipped devices or components, such as UE 1300, discussed above. Briefly, at 2402, the device determines whether or not a sounding beam for a data channel communication is available. At 2204, the device derives, in response to a determination that a sounding beam is not available, at least one power control parameter for the data channel communication from an RRC control configuration. At 2206, the device transmits the data channel communication based, at least in part, on the power control parameter derived from the RRC control configuration. In some aspects, the functions discussed in connection with FIG. 24 may be implemented by a suitable device or apparatus, such as: a processor configured to: determine whether or not a sounding beam for a data channel communication is available; derive, in response to a determination that a sounding beam is not available, at least one power control parameter for the data channel communication from an RRC control configuration; and transmit the data channel communication based, at least in part, on the power control parameter derived from the RRC control configuration.

In other aspects, the functions discussed in connection with FIG. 24 may be implemented by a suitable device or apparatus, such as: means for determining whether or not a sounding beam for a data channel communication is available; means for deriving, in response to a determination that a sounding beam is not available, at least one power control parameter for the data channel communication from an RRC control configuration; and means for transmitting the data channel communication based, at least in part, on the power control parameter derived from the RRC control configuration. In some aspects, the functions discussed in connection with FIG. 24 may be set forth within a non-transitory processor-readable medium that includes instructions, which when executed by a processor, that cause the processor to: determine whether or not a sounding beam for a data channel communication is available; derive, in response to a determination that a sounding beam is not available, at least one power control parameter for the data channel communication from an RRC control configuration; and transmit the data channel communication based, at least in part, on the power control parameter derived from the RRC control configuration.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that, generally speaking, logical blocks, modules, circuits, and algorithm steps may be implemented as electronic hardware, computer software, or combinations of both. To clearly illustrate this interchangeability of hardware and software, which may be appropriate in some cases depending upon the particular function, various illustrative components, blocks, modules, circuits, and steps have been described above generally in terms of their functionality. Whether such functionality is implemented as hardware or software depends upon the particular application and design constraints imposed on the overall system. In particular, as already explained, certain components should be implemented entirely in HW to provide for effective SW resiliency.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication within a wireless communication system, comprising:
    determining whether or not a sounding beam for a data channel communication is available;
    deriving, in response to a determination that the sounding beam is not available, at least one power control parameter for the data channel communication from a radio resource control (RRC) control configuration and based on a parameter set configuration index being set to a selected fixed value of two, wherein deriving the at least one power control parameter comprises deriving a P0 parameter ($P_{O\_PUSCH,f,c}(j)$) based on the parameter set configuration index (j) being set to a value of two when a sounding reference signal (SRS) or SRS resource indicator (SRI) is absent; and
    transmitting the data channel communication based, at least in part, on the at least one power control parameter derived from the RRC control configuration.

2. The method of claim 1, wherein the sounding beam comprises a sounding reference signal (SRS) beam.

3. The method of claim 2, wherein the at least one power control parameter is set in accordance with a predetermined wireless protocol operating specification.

4. The method of claim 1, wherein the at least one power control parameter is set based on spatial relation information.

5. The method of claim 4, wherein the spatial relation information is physical uplink control channel (PUCCH) spatial relation information used to derive physical uplink shared channel (PUSCH) spatial relation information in response to a determination that a sounding beam is not available.

6. The method of claim 4, wherein the spatial relation information comprises a downlink path loss reference signal.

7. The method of claim 1, wherein the at least one power control parameter is derived without using spatial relation information.

8. The method of claim 1, further comprising setting the parameter set configuration index to the selected fixed value of two when a sounding reference signal (SRS) or SRS resource indicator (SRI) is absent.

9. A method of wireless communication within a wireless communication system, comprising:
    determining whether or not a sounding beam for a data channel communication is available;
    deriving, in response to a determination that the sounding beam is not available, at least one power control parameter for the data channel communication from a radio resource control (RRC) control configuration and based on a parameter set configuration index being set to a selected fixed value of two;
    setting a power control adjustment state loop index to a selected fixed value when a sounding reference signal (SRS) or SRS resource indicator (SRI) is absent; and
    transmitting the data channel communication based, at least in part, on the at least one power control parameter derived from the RRC control configuration.

10. The method of claim 9, wherein the power control adjustment state loop index (l) is set to zero when the SRS or SRI is absent.

11. The method of claim 9, wherein deriving the at least one power control parameter comprises deriving a P0 parameter ($P_{O\_PUSCH,f,c}(j)$) based on the parameter set configuration index (j) being set to a value of two when a sounding reference signal (SRS) or SRS resource indicator (SRI) is absent.

12. A user equipment, comprising:
    at least one antenna; and
    a processing circuit, operatively coupled to the at least one antenna, the processing circuit configured to:
        determine whether or not a sounding beam for a data channel communication is available,
        derive, in response to a determination that the sounding beam is not available, at least one power control parameter for the data channel communication from a radio resource control (RRC) control configuration and based on a parameter set configuration index being set to a selected fixed value of two, wherein the processing circuit is configured to derive the at least one power control parameter by being configured to derive a P0 parameter ($P_{O\_PUSCH,f,c}(j)$) based on the parameter set configuration index (j) being set to a value of two when a sounding reference signal (SRS) or SRS resource indicator (SRI) is absent, and transmit the data channel communication based, at least in part, on the at least one power control parameter derived from the RRC control configuration.

13. The user equipment of claim 12, wherein the sounding beam comprises a sounding reference signal (SRS) beam.

14. The user equipment of claim 13, wherein the processing circuit is further configured to set the at least one power control parameter in accordance with a predetermined wireless protocol operating specification.

15. The user equipment of claim 13, wherein the processing circuit is further configured to set the at least one power control parameter based on spatial relation information.

16. The user equipment of claim 15, wherein the spatial relation information is physical uplink control channel (PUCCH) spatial relation information and the processing circuit is further configured to derive physical uplink shared channel (PUSCH) spatial relation information in response to a determination that a sounding beam is not available.

17. The user equipment of claim 15, wherein the spatial relation information comprises a downlink path loss reference signal.

18. The user equipment of claim 13, wherein the processing circuit is further configured to derive the at least one power control parameter without using spatial relation information.

19. An apparatus for wireless communication, comprising:
   means for determining whether or not a sounding beam for a data channel communication is available;
   means for deriving, in response to a determination that the sounding beam is not available, at least one power control parameter for the data channel communication from a radio resource control (RRC) control configuration and based on a parameter set configuration index being set to a selected fixed value of two, wherein the means for deriving the at least one power control parameter comprises means for deriving a P0 parameter $(P_{O\_PUSCH,f,c}(j))$ based on the parameter set configuration index (j) being set to a value of two when a sounding reference signal (SRS) or SRS resource indicator (SRI) is absent; and
   means for transmitting the data channel communication based, at least in part, on the at least one power control parameter derived from the RRC control configuration.

20. The apparatus of claim 19, wherein the sounding beam comprises a sounding reference signal (SRS) beam.

21. The apparatus of claim 20, wherein the at least one power control parameter is set in accordance with a predetermined wireless protocol operating specification.

22. The apparatus of claim 19, wherein the at least one power control parameter is set based on spatial relation information.

23. The apparatus of claim 22, wherein the spatial relation information is physical uplink control channel (PUCCH) spatial relation information used to derive physical uplink shared channel (PUSCH) spatial relation information in response to a determination that a sounding beam is not available.

24. The apparatus of claim 22, wherein the spatial relation information comprises a downlink path loss reference signal.

25. The apparatus of claim 19, wherein the at least one power control parameter is derived without using spatial relation information.

26. The apparatus of claim 19, further comprising means for setting a power control adjustment state loop index to a selected fixed value when a sounding reference signal (SRS) or SRS resource indicator (SRI) is absent.

27. The apparatus of claim 26, wherein the power control adjustment state loop index (1) is set to zero when the SRS or SRI is absent.

28. The apparatus of claim 19, further comprising means for setting the parameter set configuration index to the selected fixed value of two when a sounding reference signal (SRS) or SRS resource indicator (SRI) is absent.

29. A non-transitory processor-readable medium storing code for wireless communication, the code comprising instructions executable by a processor to cause the processor to:
   determine whether or not a sounding beam for a data channel communication is available;
   derive, in response to a determination that the sounding beam is not available, at least one power control parameter for the data channel communication from a radio resource control (RRC) control configuration and based on a parameter set configuration index being set to a selected fixed value of two, wherein the instructions executable to derive the at least one power control parameter comprise instructions executable by the processor to derive a P0 parameter $P_{O\_PUSCH,f,c}(j))$ based on the parameter set configuration index (j) being set to a value of two when a sounding reference signal (SRS) or SRS resource indicator (SRI) is absent; and
   transmit the data channel communication based, at least in part, on the at least one power control parameter derived from the RRC control configuration.

30. A user equipment, comprising:
   at least one antenna; and
   a processing circuit, operatively coupled to the at least one antenna, the processing circuit configured to:
      determine whether or not a sounding beam for a data channel communication is available;
      derive, in response to a determination that the sounding beam is not available, at least one power control parameter for the data channel communication from a radio resource control (RRC) control configuration and based on a parameter set configuration index being set to a selected fixed value of two;
      setting a power control adjustment state loop index to a selected fixed value when a sounding reference signal (SRS) or SRS resource indicator (SRI) is absent; and
      transmit the data channel communication based, at least in part, on the at least one power control parameter derived from the RRC control configuration.

* * * * *